US012794620B2

(12) United States Patent
Hong et al.

(10) Patent No.: US 12,794,620 B2
(45) Date of Patent: Nov. 10, 2026

(54) SYNCHRONIZATION SIGNAL BLOCK SSB TRANSMISSION METHOD, TERMINAL DEVICE, AND NETWORK DEVICE

(71) Applicant: VIVO MOBILE COMMUNICATION CO., LTD., Guangdong (CN)

(72) Inventors: Qi Hong, Guangdong (CN); Gen Li, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 759 days.

(21) Appl. No.: 18/155,898

(22) Filed: Jan. 18, 2023

(65) Prior Publication Data

US 2023/0155769 A1 May 18, 2023

Related U.S. Application Data

(63) Continuation of application No. PCT/CN2021/107280, filed on Jul. 20, 2021.

(30) Foreign Application Priority Data

Jul. 22, 2020 (CN) ......................... 202010727618.3

(51) Int. Cl.

| | |
|---|---|
| ***H04L 5/00*** | (2006.01) |
| ***H04W 72/1273*** | (2023.01) |
| ***H04W 72/30*** | (2023.01) |

(52) U.S. Cl.

CPC ....... *H04L 5/0048* (2013.01); *H04W 72/1273* (2013.01); *H04W 72/30* (2023.01)

(58) Field of Classification Search

CPC ................ H04L 5/0048; H04W 72/30; H04W 72/1273; H04W 28/065; H04W 80/02

See application file for complete search history.

(56) References Cited

U.S. PATENT DOCUMENTS

2020/0154341 A1* 5/2020 Sun ........................ H04W 48/12
2020/0229093 A1 7/2020 Ahmad et al.
(Continued)

FOREIGN PATENT DOCUMENTS

CN 109661031 A 4/2019
CN 110235477 A 9/2019
(Continued)

OTHER PUBLICATIONS

ZTE, Sanechips, Discussion on enhancement of initial access procedures for NR-U, Discussion and Decision, 3GPP TSG RAN WG1 Meeting #96bis, R1-1903874, Apr. 8-12, 2019, Xi'an, China.

*Primary Examiner* — Tonia L Dollinger
(74) *Attorney, Agent, or Firm* — Perilla Knox & Hildebrandt; Kenneth A. Knox

(57) ABSTRACT

This application discloses a synchronization signal block (SSB) transmission method, a terminal device, and a network device, and pertains to the communications field. The synchronization signal block (SSB) transmission method includes: determining a candidate SSB having a quasi-co-location (QCL) relationship within one transmission period, where the QCL relationship corresponds to a synchronization information block pattern SSB pattern; determining, according to the QCL relationship and information related to sending of a first SSB, a candidate SSB index corresponding to the first SSB, where the first SSB is a candidate SSB sent by a network device; and performing a target operation according to the candidate SSB index corresponding to the first SSB.

20 Claims, 5 Drawing Sheets

(56) References Cited

U.S. PATENT DOCUMENTS

| | | | | |
|---|---|---|---|---|
| 2020/0280940 | A1* | 9/2020 | Kim | H04J 11/0086 |
| 2020/0280957 | A1 | 9/2020 | Gao et al. | |
| 2020/0336872 | A1* | 10/2020 | Basu Mallick | H04W 4/029 |
| 2021/0058971 | A1* | 2/2021 | MolavianJazi | H04W 72/23 |
| 2021/0235513 | A1 | 7/2021 | Kim et al. | |
| 2021/0282079 | A1 | 9/2021 | Wu et al. | |
| 2021/0320711 | A1 | 10/2021 | Lee et al. | |
| 2022/0022148 | A1 | 1/2022 | Shen et al. | |
| 2022/0217660 | A1 | 7/2022 | Liu | |
| 2022/0217665 | A1 | 7/2022 | Liu | |
| 2022/0394526 | A1* | 12/2022 | Wang | H04W 68/005 |

FOREIGN PATENT DOCUMENTS

| | | | |
|---|---|---|---|
| CN | 110249582 | A | 9/2019 |
| CN | 110635877 | A | 12/2019 |
| CN | 111262674 | A | 6/2020 |
| EP | 3941141 | A1 | 1/2022 |
| KR | 20200007686 | A | 1/2020 |
| WO | 2020050682 | A1 | 3/2020 |
| WO | 2020102358 | A2 | 5/2020 |
| WO | 2020107488 | A1 | 6/2020 |

* cited by examiner

SYNCHRONIZATION SIGNAL BLOCK SSB TRANSMISSION METHOD, TERMINAL DEVICE, AND NETWORK DEVICE

CROSS-REFERENCE

The present disclosure is a continuation application of International Application No. PCT/CN2021/107280 filed on Jul. 20, 2021, which claims priority to Chinese Patent Application No. 202010727618.3, filed with the China National Intellectual Property Administration on Jul. 22, 2020 and entitled "SYNCHRONIZATION SIGNAL BLOCK SSB TRANSMISSION METHOD, TERMINAL DEVICE, AND NETWORK DEVICE", which are incorporated herein by reference in their entireties.

TECHNICAL FIELD

This application relates to the communications field, and in particular, to a synchronization signal block (SSB) transmission method, a terminal device, and a network device.

BACKGROUND

Because of a lack of low frequency resources, in a new radio (NR) system, a high frequency band such as a millimeter wave is used, that is, a frequency band FR2. Considering that a propagation loss of a high frequency band is greater than that of a low frequency band, the NR system is worse than a Long Term Evolution (LTE) system in terms of coverage distance. Therefore, the NR system may implement signal enhancement through multi-antenna beamforming (Beam Forming), to implement coverage enhancement. A synchronization signal block (SSB) is also sent through beamforming.

Further, considering that a beam in the NR system is relatively narrow, a same SSB may be sent in different directions through beamforming in a time division duplexing (TDD) manner, so that user equipment (UE, also referred to as a terminal device) in each direction can receive the SSB. For example, in a range of a half frame (5 milliseconds), a network device side (for example, a base station) sends a plurality of SSBs to separately cover different directions, and when UE receives a plurality of SSBs with different signal strength, the UE select an SSB with the strongest signal strength to determine a beam for receiving the SSB. After determining the receive beam of the UE, the UE may need to switch from the current receive beam to another receive beam due to a plurality of reasons such as a channel state deterioration of the current receive beam, and switching of the beam for receiving the SSB takes some time.

In addition, as a bandwidth increases, a larger subcarrier spacing (SCS) may be used for both a data signal and an SSB, and switching times of different SSB receive beams are included in a cyclic prefix (CP) length. Therefore, in time domain location configurations of some SSBs, because there is no gap between many SSBs, and a CP length is not enough to support an switching time of an SSB receive beam, a problem that the switching time of the SSB receive beam is insufficient may occur, thereby affecting system communication efficiency.

SUMMARY

According to a first aspect, an embodiment of this application provides a synchronization signal block (SSB) transmission method. The method is applied to a terminal device and includes:

determining a candidate SSB having a quasi-co-location (QCL) relationship within one transmission period, where the QCL relationship corresponds to a synchronization information block pattern SSB pattern; determining, according to the QCL relationship and information related to sending of a first SSB, a candidate SSB index corresponding to the first SSB, where the first SSB is a candidate SSB sent by a network device; and performing a target operation according to the candidate SSB index corresponding to the first SSB.

According to a second aspect, an embodiment of this application provides a terminal device, and the terminal device includes:

a first determining module, configured to determine a candidate SSB having a quasi-co-location (QCL) relationship within one transmission period, where the QCL relationship corresponds to a synchronization information block pattern SSB pattern; a second determining module, configured to determine, according to the QCL relationship and information related to sending of a first SSB, a candidate SSB index corresponding to the first SSB, where the first SSB is a candidate SSB sent by a network device; and a processing module, configured to perform a target operation according to the candidate SSB index corresponding to the first SSB.

According to a third aspect, an embodiment of this application provides a terminal device, including a memory, a processor, and a program or an instruction that is stored in the memory and that can be run on the processor, where when the program or the instruction is executed by the processor, the steps of the method in the first aspect are implemented.

According to a fourth aspect, an embodiment of this application provides a readable storage medium. The readable storage medium stores a program or an instruction, and when the program or the instruction is executed by a processor, the steps of the method in the first aspect are implemented.

According to a fifth aspect, an embodiment of this application provides a synchronization signal block (SSB) transmission method. The method is applied to a network device and includes:

determining a candidate SSB having a quasi-co-location (QCL) relationship within one transmission period, where the QCL relationship corresponds to a synchronization information block pattern SSB pattern; and sending a first SSB to a terminal device, where a candidate SSB index corresponding to the first SSB is determined based on the QCL relationship and information related to sending of the first SSB.

According to a sixth aspect, an embodiment of this application provides a network device, and the network device includes:

a determining module, configured to determine a candidate SSB having a quasi-co-location (QCL) relationship within one transmission period, where the QCL relationship corresponds to a synchronization information block pattern SSB pattern; and a transmission module, configured to send a first SSB to a terminal device, where a candidate SSB index corresponding to the first SSB is determined based on the QCL relationship and information related to sending of the first SSB.

According to a seventh aspect, an embodiment of this application provides a network device, including a memory, a processor, and a program or an instruction that is stored in the memory and that can be run on the processor, where when the program or the instruction is executed by the processor, the steps of the method in the fifth aspect are implemented.

According to an eighth aspect, an embodiment of this application provides a readable storage medium. The readable storage medium stores a program or an instruction, and when the program or the instruction is executed by a processor, the steps of the method in the fifth aspect are implemented.

BRIEF DESCRIPTION OF DRAWINGS

The accompanying drawings described herein are intended to provide a further understanding of the present disclosure, and constitute a part of the present disclosure. The illustrative embodiments of the present disclosure and descriptions thereof are intended to describe the present disclosure, and do not constitute limitations on the present disclosure. In the accompanying drawings.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the specification and claims of this application, the terms "first", "second", and the like are intended to distinguish between similar objects but do not describe a specific order or sequence. It should be understood that the data used in such a way is interchangeable in proper circumstances so that the embodiments of this application can be implemented in an order other than the order illustrated or described herein. In addition, in the specification and the claims, "and/or" represents at least one of connected objects, and a character "I" generally represents an "or" relationship between associated objects.

The technical solutions of this application can be applied to various communications systems, such as a Global System for Mobile Communications (GSM), a Code Division Multiple Access (CDMA) system, a Wideband Code Division Multiple Access (WCDMA) system, a general packet radio service (GPRS) system, a Long Term Evolution/Long Term Evolution-advanced (LTE-A) system, and an NR system.

User equipment UE may also be referred to as a terminal device (Mobile Terminal), mobile user equipment, and the like. The UE may communicate with one or more core networks by using a radio access network (RAN). The user equipment may be a terminal device such as a mobile phone (or referred to as a "cellular" phone), and a computer having a terminal device. For example, the user equipment may be a portable, pocket-sized, handheld, computer built-in, or in-vehicle mobile apparatus, which exchanges voice and/or data with the radio access network.

A network device may also be referred to as a base station, and may be a base transceiver station (BTS) in GSM or CDMA, may be a NodeB (NodeB) in WCDMA, or may be an evolved NodeB (eNB or e-NodeB) in LTE and a 5G base station (gNB).

The following describes in detail the technical solutions provided in the embodiments of this application with reference to the accompanying drawings.

Figure 1:
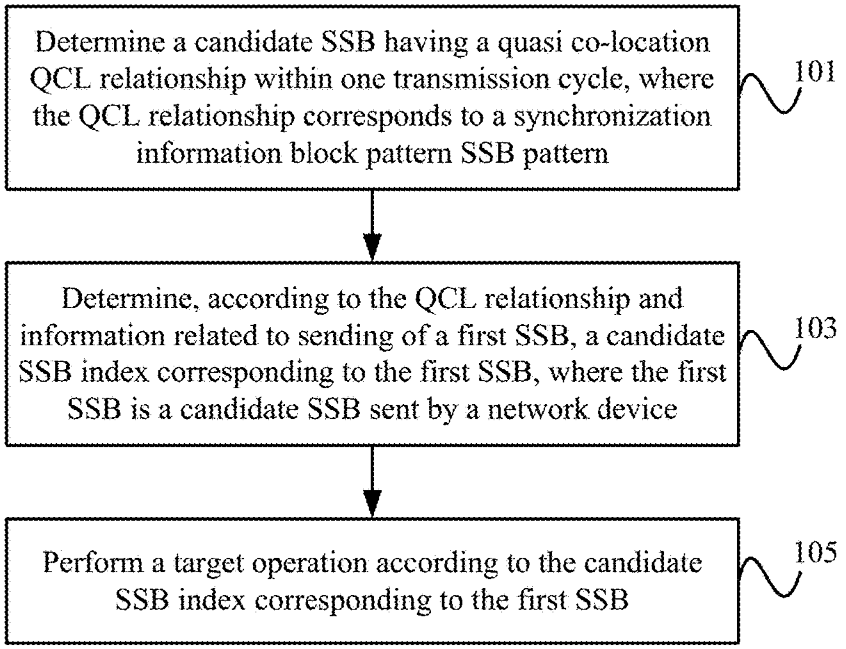
FIG. 1 is a schematic flowchart of a synchronization signal block (SSB) transmission method according to an embodiment of this application.

Referring to FIG. 1, an embodiment of this application provides a synchronization signal block (SSB) transmission method. The method is performed by a terminal device and includes steps of the following procedures.

Step 101: Determine a candidate SSB having a quasi-co-location (QCL) relationship within one transmission period, where the QCL relationship corresponds to a synchronization information block pattern SSB pattern.

Step 103: Determine, according to the QCL relationship and information related to sending of a first SSB, a candidate SSB index corresponding to the first SSB, where the first SSB is a candidate SSB sent by a network device.

Step 105: Perform a target operation according to the candidate SSB index corresponding to the first SSB.

In this embodiment of this application, a terminal device may first determine an extended candidate SSB having a quasi-co-location (QCL) relationship within one transmission period, and may determine, according to the QCL relationship corresponding to a specific synchronization information block pattern SSB pattern and information related to sending of a first SSB, that is, a candidate SSB actually sent by a network device, a candidate SSB index corresponding to the first SSB actually sent by the network device, so as to further perform some subsequent operations, that is, a target operation, according to the candidate SSB index corresponding to the actually sent SSB. In this way, the quantity of existing candidate SSBs is extended, and limited SSB transmission is performed based on SSB information actually sent by the network device in different SSB patterns, to resolve a problem that a switching time of an SSB receive beam is insufficient, thereby improving system communication efficiency. Especially, in a high frequency band (for example, a frequency band FR2x, that is, a frequency band beyond 52.6 GHz), because a relatively large subcarrier spacing is used by an SSB, there is no gap between many candidate SSBs, and a length of a CP is insufficient to support a switching time of an SSB receive beam.

Optionally, in the SSB transmission method in this embodiment of this application, the synchronization information block pattern SSB pattern may be an SSB time domain position configuration.

Optionally, in the SSB transmission method in this embodiment of this application, the target operation may include at least rate matching (rate matching), physical random access channel (PRACH) validation (validation), physical uplink control channel (PUCCH) validation, and the like.

Optionally, in the SSB transmission method in this embodiment of this application, the candidate SSB index (index) corresponding to the first SSB is indicated by at least one of a first field and a second field corresponding to the first SSB. It can be understood that in this embodiment, information about a candidate SSB index may be jointly indicated by using different fields.

Optionally, the first field includes an indication field that is in a physical broadcast channel demodulation reference signal (PBCH-DMRS) and a physical broadcast channel (PBCH) corresponding to the first SSB and that is used to indicate an SSB index.

Optionally, the second field is a part or all of other function indication fields in the actually sent first SSB, or a combination of a plurality of function indication fields, including but not limited to at least one of the following:

(1) A common subcarrier spacing indication field in the first SSB.

Optionally, there is an association relationship between the common subcarrier spacing indication field and a subcarrier spacing used by an SSB.

The association relationship may be a same relationship or a fixed multiple relationship between a common subcarrier spacing corresponding to the common subcarrier spacing indication field and the subcarrier spacing used by the SSB.

(2) A physical downlink shared channel demodulation reference signal (PDSCH-DMRS) position indication field in the first SSB.

Optionally, in an example, there is an association relationship between the PDSCH-DMRS position indication field and a subcarrier spacing used by an SSB.

The association relationship may indicate that the subcarrier spacing used by the SSB corresponds to a position indicated by the PDSCH-DMRS position indication field. It can be understood that, for example, a position of a PDSCH DMRS reference signal is determined as 2 or 3. In this case, dmrs-TypeA-Position is not required to indicate the position of the PDSCH DMRS, and a dmrs-TypeA-Position indication field in a FR2 frequency band may be used as another bit quantity to jointly indicate an SSB index.

Optionally, in another example, the PDSCH-DMRS position indication field is used to indicate a fixed PDSCH-DMRS position and there is no association relationship between the PDSCH-DMRS position indication field and a subcarrier spacing used by an SSB.

(3) A physical downlink control channel configuration system information block (SIB) indication field (pdcch-ConfigSIB1) in the first SSB.

Further, optionally, the second field may be at least some bits of the physical downlink control channel configuration system information block indication field in the first SSB.

Optionally, the quantity of valid licenses in a configuration table corresponding to a CORESET indicated by the physical downlink control channel configuration system information block indicator field is less than a first threshold; and/or the quantity of valid licenses in a configuration table corresponding to a search space indicated by the physical downlink control channel configuration system information block indication field is less than a second threshold.

Optionally, the physical downlink control channel configuration system information block indication field may indicate that the quantity of valid entries in a configuration table of a CORESET #0 and/or a configuration table of a search space #0 is reduced, and is less than a corresponding threshold. Specifics value of the first threshold and the second threshold may be set based on an actual situation.

It can be understood that, for example, during operating on a frequency band greater than 52.6 GHz, an SCS of a CORESET #0 may be obtained by using an SCS of an SSB, that is, there is a binding relationship between the SCS of the SSB and the SCS of the CORESET #0, for example, (SSB, CORESET #0)=(480K, 960K), (960K, 960K), or (1920K, 1920K). In this case, the subCarrierSpacingCommon indication field in the frequency band FR2x may be used as another bit quantity to jointly indicate an SSB index.

Further, if the configuration table of the CORESET #0 is modified, and the quantity of valid entries is reduced, for example, only FDM multiplexing between the SSB and the CORESET #0 is supported, or a multiplexing pattern 2/3 between the SSB and the CORESET #0 is supported. In this case, M high-order bits or M low-order bits ($M \geq 1$) configured by the CORESET #0 in the SSB when the frequency band FR2x is used for transmission may be used as another bit quantity to jointly indicate an SSB Index.

(4) A reserved field in the first SSB. It can be understood that a spare bit in an SSB on the frequency band FR2x is used as another bit quantity to jointly indicate an SSB Index.

It should be noted that an SSB beam index and an SSB index are equivalent, and an SSB time domain position is determined by using the candidate SSB index.

Optionally, in the SSB transmission method in this embodiment of this application, the synchronization information block pattern SSB pattern corresponding to the foregoing QCL may have different examples, so as to perform limited SSB transmission in different SSB patterns, including but not limited to the following specific embodiments:

Specific Embodiment 1

In the specific embodiment 1, the QCL relationship corresponds to a first synchronization information block pattern SSB pattern. Further, optionally, there is the QCL relationship between consecutive candidate SSBs of the first quantity within the one transmission period, where the first quantity is stipulated by the protocol or configured by the network device.

Figure 2:
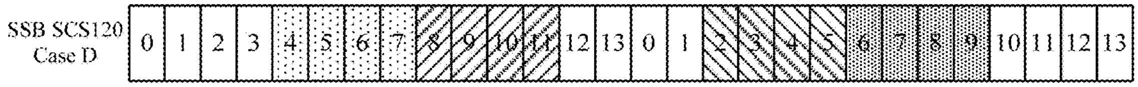
FIG. 2 is a schematic diagram of a first synchronization information block pattern SSB pattern according to an embodiment of this application.

In an example, the first SSB pattern may be Case D shown in FIG. 2. A subcarrier spacing used by an SSB is 120 kHz, and an index of a first symbol of a candidate SSB is {4, 8, 16, 20}+28*n. For F>6 GHz, n=0, 1, 2, 3, 5, 6, 7, 8, 10, 11, 12, 13, 15, 16, 17, 18 (there are 8 slots in 1 ms and 2 SSBs in 1 slot, and 16 SSBs are occupied in 1 ms in a total of 4 groups. In this case, Lmax=64 in 4 ms), and Lmax=128 may be obtained through extension.

It should be further noted that in a case that only 64 beams can be sent, if the 64 beams are extended to 128 beams, a total of 128 bits are required for the SSB index. For example, the SSBpositioninBurst indication field is used to indicate sending of an SSB, and in theory, the indication field indicates 128 bits. However, because there is a QCL relationship between the foregoing SSBs, only a 64-bit SSB index is required for an actual indication, that is, the SSB-positioninBurst indication field is still 64 bits.

Optionally, when the first quantity is configured by the network device, specifically, the network device may configure the first quantity by using a PBCH message, a SIB message, or a radio resource control (RRC) message.

Optionally, a value of the first quantity is the same as a value of a beam index of the first SSB, the value of the beam index (beam index) of the first SSB is a result of rounding a first value, and the first value is a ratio of a value of a candidate index corresponding to the first SSB to the first quantity.

Specifically, the value of the beam index of the first SSB is the result of rounding down the first value, where the first value=floor (candidate SSB index/Q), and Q represents the first quantity.

Optionally, in the specific embodiment 1, the information related to sending of the first SSB may include at least one of the following examples, so as to implement, with reference to the first SSB pattern, diversity of schemes of determining the candidate SSB index corresponding to the first SSB.

Example 1

In the example 1, the information related to sending of the first SSB includes first information, where the first information is used to indicate a first bitmap corresponding to a beam index of the first SSB.

Optionally, in the example 1, in a case that the first bitmap is a second value, the first information is used to indicate that the network device does not send SSBs corresponding to all candidate SSB indexes associated with the beam index of the first SSB; and in a case that the first bitmap is a third value, the first information is used to indicate that the network device sends a target SSB corresponding to at least one candidate SSB index associated with the beam index of the first SSB.

In an example, if the second value is 0, it may indicate that the SSBs corresponding to all the candidate SSB indexes associated with the beam index of the first SSB are not sent. If the third value is 1, it may indicate that the target SSB corresponding to the at least one candidate SSB index associated with the beam index of the first SSB is actually sent. It should be noted that when the second value is 1, the third value may be 0, that is, vice versa.

Further, optionally, in the example 1, if the first bitmap is the third value, the target SSB includes one of the following:

(1) all SSBs corresponding to the at least one candidate SSB index associated with the beam index of the first SSB; and (2) an SSB corresponding to a first candidate SSB index in the at least one candidate SSB index associated with the beam index of the first SSB.

In an example, when the SSB corresponding to the first candidate SSB index is a specified SSB that is actually sent, the first SSB or the last SSB may be actually sent.

Optionally, the target SSB is related to a synchronization raster (sync raster) in which the target SSB is located; or the target SSB is related to a characteristic of a searched primary synchronization signal (PSS) or secondary synchronization signal (Secondary Synchronization Signal, SSS).

Optionally, the SSB corresponding to the first candidate SSB index is stipulated by the protocol or implicitly indicated by the network device by using a first preset field.

Optionally, the first preset field may include a cell identity (cell ID), a PSS sequence (sequence) or an SSS sequence, and the like.

Example 2

In the example 2, the information related to sending of the first SSB includes the first information and second information, where the first information is used to indicate a first bitmap corresponding to a beam index of the first SSB; and the second information is used to indicate sending information of a plurality of candidate SSB indexes corresponding to a same beam index.

Optionally, in the example 2, in a case that the first bitmap is a second value, the first information is used to indicate that the network device does not send SSBs corresponding to all candidate SSB indexes associated with the beam index of the first SSB; and in a case that the first bitmap is a third value, the first information is used to indicate that the network device sends a target SSB corresponding to at least one candidate SSB index associated with the beam index of the first SSB.

In an example, if the second value is 0, it may indicate that the SSBs corresponding to all the candidate SSB indexes associated with the beam index of the first SSB are not sent. If the third value is 1, it may indicate that the target SSB corresponding to the at least one candidate SSB index associated with the beam index of the first SSB is actually sent. It should be noted that when the second value is 1, the third value may be 0, that is, vice versa.

Optionally, in the example 2, the second information may be indicated by using a 1-bit field, may be directly stipulated by the protocol (that is, predefined), or may be indicated by using another implicit relationship. For example, only one of an SSB0 {4, 5, 6, 7} and an SSB1 {8, 9, 10, 11} that have the QCL relationship shown in FIG. 2 is sent, or both an SSB0 and an SSB1 that have the QCL relationship are sent as a whole, which may be indicated by 1 bit or stipulated by the protocol, so as to improve a relatively sufficient gap (Gap). That is, the second information may be indicated in at least one of the following manners:

(1) Being indicated by a 1-bit field.

Further, optionally, the 1-bit field is configured by the network device in one of the following manners:

(a) the quantity of bits in a PBCH; and (b) the preset quantity of bits added to a first parameter. Optionally, the first parameter may be ssb-PositionsInBurst.

Further, optionally, in a case that a value indicated by the 1-bit field is a fourth value, the second information is used to indicate that the network device sends an SSB corresponding to a second candidate SSB index in a plurality of candidate SSB indexes corresponding to a beam index of the third value indicated by the first information; and in a case that the value indicated by the 1-bit field is a fifth value, the second information is used to indicate that the network device sends all SSBs corresponding to the plurality of candidate SSB indexes corresponding to the beam index of the third value indicated by the first information.

Optionally, when the fourth value is 0, the fifth value may be 1; or when the fourth value is 1, the fifth value may be 0.

Optionally, the SSB corresponding to the second candidate SSB index is stipulated by the protocol or implicitly indicated by the network device by using a third preset field.

In an example, when the SSB corresponding to the second candidate SSB index is a specified SSB that is actually sent, the first SSB or the last SSB may be actually sent.

(2) Being stipulated by the protocol.

(3) Being implicitly indicated by the network device by using a second preset field. Optionally, the second preset field may include a cell identity (cell ID), a PSS sequence (sequence) or an SSS sequence, and the like.

Figure 3:
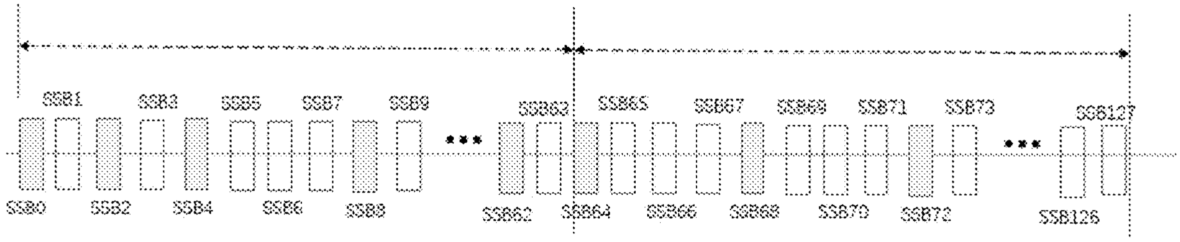
FIG. 3 is a schematic diagram of an actually sent SSB corresponding to the first SSB pattern according to an embodiment of this application.

In a specific example of the specific embodiment 1, the quantity of SSB beams is first increased to 128. It is assumed that two consecutive SSB beams are in QCL, that is, an SSB0 is in QCL with an SSB1, an SSB2 and an SSB3 . . . , as shown in FIG. 3. In this case, each bit in the bitmap indicated by the first information in the ssb-PositionsInBurst indication field instructs whether to transmit SSBs having a QCL relationship. For example, a first bit in a 64-bit bitmap indicates the SSB0 and the SSB1, and a second bit indicates the SSB2 and the SSB3.

For the first information, a bitmap indicating beam indexes of actually sent SSBs is shown, and ssb-PositionsInBurst is (11101 . . . 1 10101 . . . 0) with a total of 64 bits. 0 represents that SSBs (for example, an SSB6 and an SSB1) of all candidate SSB indexes corresponding to a beam index of the SSB are not sent, and 1 represents that SSBs of at least one candidate SSB index (for example, an SSB0 and an SSB1) corresponding to the beam index of the SSB are actually sent.

For the second information, a meaning represented by each 1 in the first information is indicated, where 0 (or 1) represents that a specific SSB (for example, the first or last SSB) in a plurality of candidate SSB indexes corresponding to an SSB beam index 1 in the first information is actually sent, and 1 (or 0) represents that all SSBs in the plurality of candidate SSB indexes corresponding to the SSB beam index 1 in the first information are actually sent (in this example, the first SSB in the plurality of candidate SSB indexes is actually sent).

It can be learned from the foregoing that in the SSB transmission method in this embodiment of this application, the first information may be used to indicate whether to send the candidate SSB having the QCL relationship, and the first information may be further used to indicate a specific part of the candidate SSB having the QCL relationship that is to be sent. Alternatively, the first information may be used to indicate whether to send the candidate SSB having the QCL relationship, and the second information is used to indicate a specific part of the candidate SSB having the QCL relationship that is to be sent. The candidate SSB index may be indicated by using the first field and/or the second field.

Specific Embodiment 2

In the specific embodiment 2, the QCL relationship corresponds to a second synchronization information block pattern SSB pattern. Further, optionally, there is the QCL relationship between consecutive synchronization pulse sequence sets SS burst sets of the second quantity within the one transmission period and each of the SS burst sets includes consecutive candidate SSBs of the third quantity that are sequentially captured in all candidate SSBs.

Figure 4:
FIG. 4 is a schematic diagram of a second synchronization information block pattern SSB pattern according to an embodiment of this application.

In an example, the second SSB pattern may be Case E shown in FIG. 4. A subcarrier spacing used by an SSB is 240 kHz, and an index of a first symbol of a candidate SSB is {8, 12, 16, 20, 32, 36, 40, 44}+56*n. For F>6 GHz, n=0, 1, 2, 3, 5, 6, 7, 8 (there are 16 slots in 1 ms and 2 SSBs in 1 slot, and 32 SSBs are occupied in 1 ms in a total of 2 groups. In this case, Lmax=64 in 2 ms), and Lmax=128 may be obtained through extension.

In another example, in a case that an SSB burst includes 64 beams, the SSB burst is extended, for example, one SSB burst is extended and there are two SSB bursts after the extension, that is, an SSB burst 1 and an SSB burst 2. In this case, when the SSB burst 1 and the SSB burst 2 have a QCL relationship, that is, an SSB 1 in the SSB burst 1 and an SSB 1 in the SSB burst 2 are in QCL.

Optionally, the second quantity is a result of performing a modulo operation on a sixth value, the sixth value is a ratio of a value of a candidate SSB index corresponding to the first SSB to the third quantity, and the third quantity is stipulated by the protocol or configured by the network device.

In an example, the second quantity=mod (candidate SSB index/M), where the candidate SSB index/M represents the sixth value, and M represents the third quantity.

Optionally, in the specific embodiment 2, the information related to sending of the first SSB may include at least one of the following examples, so as to implement, with reference to the second SSB pattern, diversity of schemes of determining the candidate SSB index corresponding to the first SSB.

Example I

In the example I, the information related to sending of the first SSB includes third information, where the third information is used to indicate a second bitmap corresponding to the first SSB.

In an example, if the second bitmap corresponding to the first SSB indicates 1, it may indicate that an SSB is actually sent; or if the second bitmap corresponding to the first SSB indicates 0, it may indicate that no SSB is sent. It should be noted that, when the second bitmap corresponding to the first SSB indicates 0, it may indicate that an SSB is actually sent, that is, vice versa.

Optionally, in the example I, the first SSB includes an SSB that are in a plurality of candidate SSBs corresponding to the third information and that is sent by the network device according to a preset rule.

Optionally, the preset rule includes one of the following:

(1) Perform, in each of the SS burst sets of the second quantity, hopping (hopping) sending on candidate SSBs corresponding to consecutive beam indexes indicated by the third information.

In an example, hopping sending is performed on consecutive SSB beams, for example, if the third information indicates (1101111 . . . 01011), each pair of consecutive "11" is sent on two SSB bursts, that is, (1001010 . . . 01010) is sent on a first SSB burst and (0100101 . . . 00001) is sent on a second SSB burst.

(2) Perform, between a plurality of SSB groups in each of the SS burst sets of the second quantity, hopping sending on candidate SSBs corresponding to consecutive beam indexes indicated by the third information, where the plurality of SSB groups are obtained by grouping SSBs in each SS burst set, and the quantity of SSBs included in each SSB group is stipulated by the protocol or configured by the network device.

Optionally, the quantity of SSBs included in each SSB group may be 4, 8, or the like, and may be specifically a multiple of 4.

In an example, SSBs are grouped. For the foregoing example of Case E, if four beams are consecutive, hopping sending may be performed in a unit of four beams, and there is a gap between every four beams. For example, if the third information indicates (1101111 . . . 01011), (1001101 . . . 01010) may be sent on a first SSB burst and (0100010 . . . 00001) is sent on a second SSB burst.

(3) Send a candidate SSB corresponding to a candidate SSB index of a first-type digit in an SS burst set whose index value is an odd number, and sending a candidate SSB corresponding to a candidate SSB index of a second-type digit in an SS burst set whose index value is an even number.

Optionally, when the first-type digit is an odd digit, the second-type digit is an even digit. On the contrary, when the first-type digit is an even digit, the second-type digit is an odd digit.

Optionally, the preset rule is related to a synchronization raster in which the first SSB is located; or the preset rule is related to a characteristic of a searched primary synchronization signal (PSS) or secondary synchronization signal (SSS).

Example II

In the example II, the information related to sending of the first SSB includes the third information and fourth information, where the third information is used to indicate a second bitmap corresponding to the first SSB.

In an example, if the second bitmap corresponding to the first SSB indicates 1, it may indicate that an SSB is actually sent; or if the second bitmap corresponding to the first SSB indicates 0, it may indicate that no SSB is sent. It should be noted that, when the second bitmap corresponding to the first SSB indicates 0, it may indicate that an SSB is actually sent, that is, vice versa.

Optionally, in the example II, the fourth information is used to indicate a preset rule, and the preset rule is used by the network device to send the first SSB in a plurality of candidate SSBs corresponding to the third information.

Further, optionally, the fourth information may be indicated by using a 1-bit field, may be directly stipulated by the protocol (that is, predefined), or may be indicated by using another implicit relationship. That is, the fourth information may be indicated in at least one of the following manners:

(1) Being indicated by a 1-bit field.

(2) Being stipulated by the protocol.

(3) Being implicitly indicated by the network device by using a fourth preset field. Optionally, the fourth preset field may include a cell identity (cell ID), a PSS sequence (sequence) or an SSS sequence, and the like.

Optionally, the preset rule includes one of the following:

(1) Perform, in each of the SS burst sets of the second quantity, hopping sending on candidate SSBs corresponding to consecutive beam indexes indicated by the third information.

In an example, hopping sending is performed on consecutive SSB beams, for example, if the third information indicates (1101111 . . . 01011), each pair of consecutive "11" is sent on two SSB bursts, that is, (1001010 . . . 01010) is sent on a first SSB burst and (0100101 . . . 00001) is sent on a second SSB burst.

(2) Perform, between a plurality of SSB groups in each of the SS burst sets of the second quantity, hopping sending on candidate SSBs corresponding to consecutive beam indexes indicated by the third information, where the plurality of SSB groups are obtained by grouping SSBs in each SS burst set, and the quantity of SSBs included in each SSB group is stipulated by the protocol or configured by the network device.

Optionally, the quantity of SSBs included in each SSB group may be 4, 8, or the like, and may be specifically a multiple of 4.

In an example, SSBs are grouped. For the foregoing example of Case E, if four beams are consecutive, hopping sending may be performed in a unit of four beams, and there is a gap between every four beams. For example, if the third information indicates (1101111 . . . 01011), (1001101 . . . 01010) may be sent on a first SSB burst and (0100010 . . . 00001) is sent on a second SSB burst.

(3) Send a candidate SSB corresponding to a candidate SSB index of a first-type digit in an SS burst set whose index value is an odd number, and sending a candidate SSB corresponding to a candidate SSB index of a second-type digit in an SS burst set whose index value is an even number.

Optionally, when the first-type digit is an odd digit, the second-type digit is an even digit. On the contrary, when the first-type digit is an even digit, the second-type digit is an odd digit.

Optionally, the preset rule is related to a synchronization raster in which the first SSB is located; or the preset rule is related to a characteristic of a searched primary synchronization signal (PSS) or secondary synchronization signal (SSS).

Figure 5:
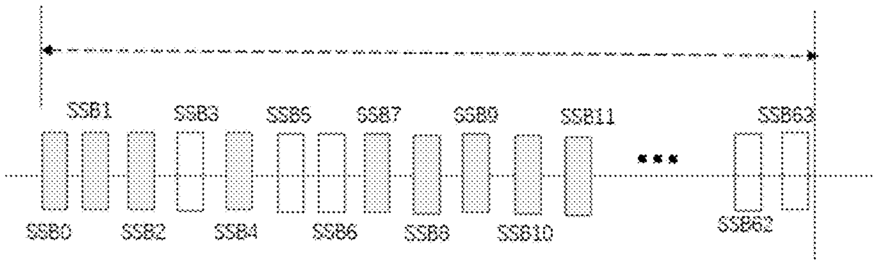
FIG. 5 is a schematic diagram of an actually sent SSB corresponding to the second SSB pattern according to an embodiment of this application.

In a specific example of the specific embodiment 2, the quantity of SSB beams is first increased to 128. In this case, a beam in a first SS burst set and a beam with a corresponding index in a second SS burst set are in QCL. Each bit is used to indicate whether to send a corresponding SSB. Each SS burst set is M consecutive SSB beams, and M=64 herein, as shown in FIG. 5.

The third information ssb-PositionsInBurst indication field may be (111010011111 . . . 00).

Figure 6:
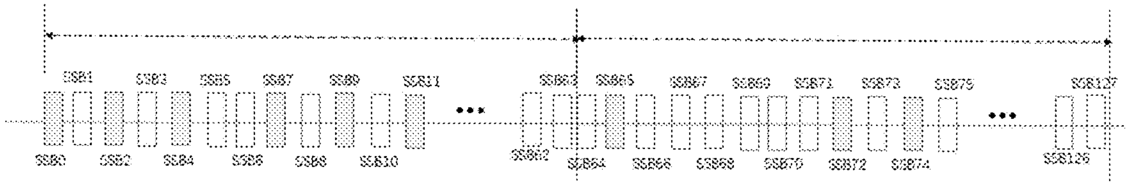
FIG. 6 is a schematic diagram of sending an SSB based on a synchronization pulse sequence set SS burst set having a QCL relationship according to an embodiment of this application.

As shown in FIG. 6, if there are consecutive beams in the third information, beam hopping (hopping) sending is performed, that is, a first beam, a third beam, and a fifth beam . . . that are consecutive in a first SS burst set are sent, and a second beam, a fourth beam, and a sixth beam . . . that are consecutive in a second SS burst set are sent.

Figure 7:
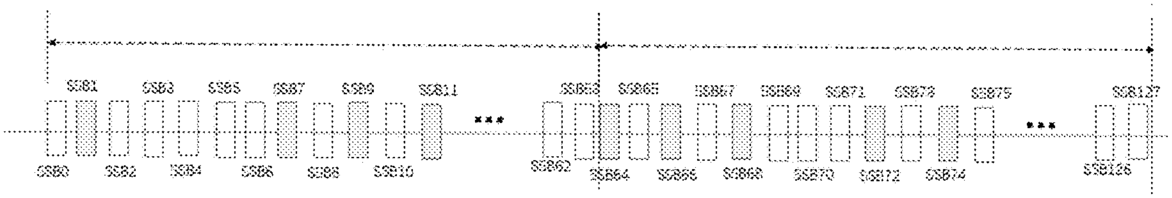
FIG. 7 is a second schematic diagram of sending an SSB based on a synchronization pulse sequence set SS burst set having a QCL relationship according to an embodiment of this application.

As shown in FIG. 7, if there are consecutive beams in the third information, only a beam corresponding to an odd digit (that is, a first-type digit) in an odd SS burst set (a first SS burst set) is sent, and only a beam corresponding to an even digit (that is, a second-type digit) in an even SS burst set (a second SS burst set) is sent.

Figure 8:
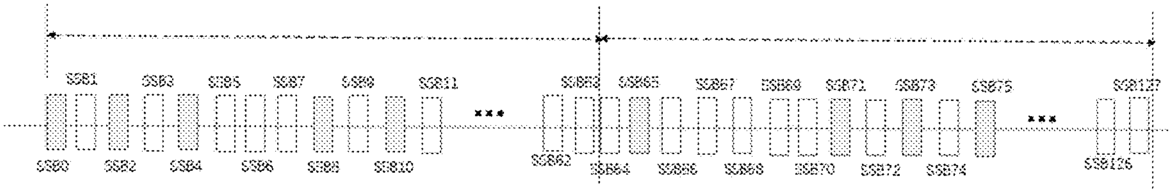
FIG. 8 is a third schematic diagram of sending an SSB based on a synchronization pulse sequence set SS burst set having a QCL relationship according to an embodiment of this application.

As shown in FIG. 8, if there are consecutive beams in the third information, only a beam corresponding to an even digit (that is, a first-type digit) in an odd SS burst set (a first SS burst set) is sent, and only a beam corresponding to an odd digit (that is, a second-type digit) in an even SS burst set (a second SS burst set) is sent.

Figure 9:
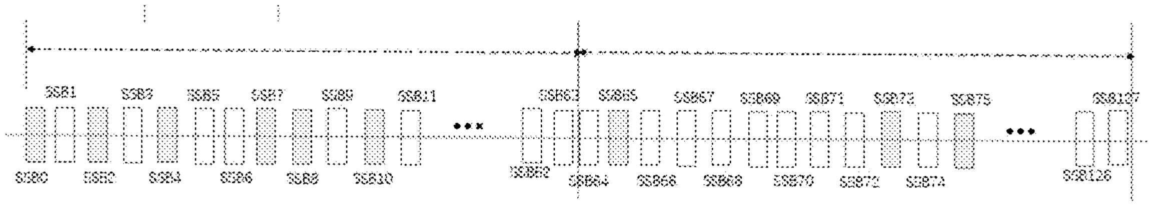
FIG. 9 is a fourth schematic diagram of sending an SSB based on a synchronization pulse sequence set SS burst set having a QCL relationship according to an embodiment of this application.

As shown in FIG. 9, if there are consecutive beams in the third information, beam processing is performed in a unit of four beams during sending, that is, a first beam in two consecutive beams in four beams in a first SS burst set is sent, and a second beam in two consecutive beams in four beams in a second SS burst set is sent.

It can be learned from the foregoing that in the SSB transmission method in this embodiment of this application, the third information may be used to indicate whether to send the candidate SSB having the QCL relationship, and the third information may be further used to indicate a specific part of the candidate SSB having the QCL relationship that is to be sent. Alternatively, the third information may be used to indicate whether to send the candidate SSB having the QCL relationship, and the fourth information is used to indicate a specific part of the candidate SSB having the QCL relationship that is to be sent. The candidate SSB index may be indicated by using the first field and/or the second field.

Figure 10:
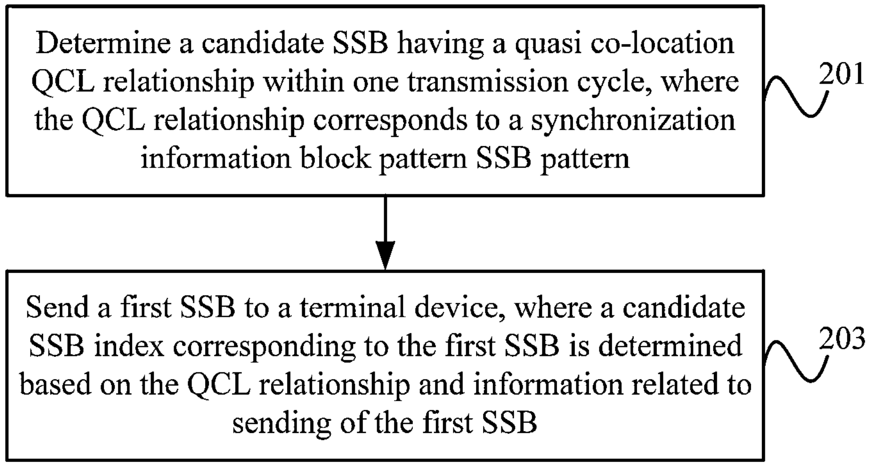
FIG. 10 is a second schematic flowchart of a synchronization signal block (SSB) transmission method according to an embodiment of this application.

Referring to FIG. 10, an embodiment of this application provides a synchronization signal block (SSB) transmission method. The method is performed by a network device and includes steps of the following procedures.

Step 201: Determine a candidate SSB having a quasi-co-location (QCL) relationship within one transmission period, where the QCL relationship corresponds to a synchronization information block pattern SSB pattern.

Step 203: Send a first SSB to a terminal device, where a candidate SSB index corresponding to the first SSB is determined based on the QCL relationship and information related to sending of the first SSB.

In this embodiment of this application, a network device may first determine an extended candidate SSB having a quasi-co-location (QCL) relationship within one transmission period, and may determine, according to the QCL relationship corresponding to a specific synchronization information block pattern SSB pattern and information related to sending of a first SSB, that is, a candidate SSB that actually needs to be sent, a candidate SSB index corresponding to the actually sent first SSB, and further send the first SSB to a terminal device, so that the terminal device can perform some subsequent operations based on the candidate SSB index corresponding to the first SSB. In this way, the quantity of existing candidate SSBs is extended, and limited SSB transmission is performed based on SSB information that actually needs to be sent in different SSB patterns, to resolve a problem that a switching time of an SSB receive beam is insufficient, thereby improving system communication efficiency. Especially, in a high frequency band (for example, a frequency band FR2x, that is, a frequency band beyond 52.6 GHz), because a relatively large subcarrier spacing is used by an SSB, there is no gap between many candidate SSBs, and a length of a CP is insufficient to support a switching time of an SSB receive beam.

Optionally, in the SSB transmission method in this embodiment of this application, the synchronization information block pattern SSB pattern may be an SSB time domain position configuration.

Optionally, in the SSB transmission method in this embodiment of this application, the candidate SSB index corresponding to the first SSB is used by the terminal device to perform a corresponding subsequent operation, which may include at least rate matching, PRACH validation, PUCCH validation, and the like.

Optionally, in the SSB transmission method in this embodiment of this application, the candidate SSB index (index) corresponding to the first SSB is indicated by at least one of a first field and a second field corresponding to the first SSB. It can be understood that in this embodiment, information about a candidate SSB index may be jointly indicated by using different fields.

Optionally, the first field includes an indication field that is in a physical broadcast channel demodulation reference signal (PBCH-DMRS) and a physical broadcast channel (PBCH) corresponding to the first SSB and that is used to indicate an SSB index.

Optionally, the second field is a part or all of other function indication fields in the actually sent first SSB, or a combination of a plurality of function indication fields, including but not limited to at least one of the following:

(1) A common subcarrier spacing indication field in the first SSB.

Optionally, there is an association relationship between the common subcarrier spacing indication field and a subcarrier spacing used by an SSB.

The association relationship may be a same relationship or a fixed multiple relationship between a common subcarrier spacing corresponding to the common subcarrier spacing indication field and the subcarrier spacing used by the SSB.

(2) A physical downlink shared channel demodulation reference signal (PDSCH-DMRS) position indication field in the first SSB.

Optionally, in an example, there is an association relationship between the PDSCH-DMRS position indication field and a subcarrier spacing used by an SSB.

The association relationship may indicate that the subcarrier spacing used by the SSB corresponds to a position indicated by the PDSCH-DMRS position indication field. It can be understood that, for example, a position of a PDSCH DMRS reference signal is determined as 2 or 3. In this case, dmrs-TypeA-Position is not required to indicate the position of the PDSCH DMRS, and a dmrs-TypeA-Position indication field in a FR2 frequency band may be used as another bit quantity to jointly indicate an SSB index.

Optionally, in another example, the PDSCH-DMRS position indication field is used to indicate a fixed PDSCH-DMRS position and there is no association relationship between the PDSCH-DMRS position indication field and a subcarrier spacing used by an SSB.

(3) A physical downlink control channel configuration system information block indication field (pdcch-ConfigSIB1) in the first SSB.

Further, optionally, the second field may be at least some bits of the physical downlink control channel configuration system information block indication field in the first SSB.

Optionally, the quantity of valid licenses in a configuration table corresponding to a CORESET indicated by the physical downlink control channel configuration system information block indicator field is less than a first threshold; and/or the quantity of valid licenses in a configuration table corresponding to a search space indicated by the physical downlink control channel configuration system information block indication field is less than a second threshold.

Optionally, the physical downlink control channel configuration system information block indication field may indicate that the quantity of valid entries in a configuration table of a CORESET #0 and/or a configuration table of a search space #0 is reduced, and is less than a corresponding threshold. Specifics value of the first threshold and the second threshold may be set based on an actual situation.

It can be understood that, for example, during operating on a frequency band greater than 52.6 GHz, an SCS of a CORESET #0 may be obtained by using an SCS of an SSB, that is, there is a binding relationship between the SCS of the SSB and the SCS of the CORESET #0, for example, (SSB, CORESET #0)=(480K, 960K), (960K, 960K), or (1920K, 1920K). In this case, the subCarrierSpacingCommon indication field on the frequency band FR2x may be used as another bit quantity to jointly indicate an SSB index.

(4) A reserved field in the first SSB. It can be understood that a spare bit in an SSB on the frequency band FR2x is used as another bit quantity to jointly indicate an SSB Index.

It can be learned from the foregoing that in the SSB transmission method in this embodiment of this application, the first field may be used to indicate whether to send the candidate SSB having the QCL relationship, and the second field is further used to indicate a specific part of the candidate SSB having the QCL relationship that is to be sent. It should be noted that an SSB beam index and an SSB index are equivalent, and an SSB time domain position is determined by using the candidate SSB index.

Optionally, in the SSB transmission method in this embodiment of this application, the synchronization information block pattern SSB pattern corresponding to the foregoing QCL may have different examples, so as to perform limited SSB transmission in different SSB patterns, including but not limited to the following specific embodiments:

Specific Embodiment 1

In the specific embodiment 1, the QCL relationship corresponds to a first synchronization information block pattern SSB pattern (Case D shown in FIG. 2. For corresponding descriptions, refer to corresponding content in the terminal-side embodiment. Details are not described herein again). Further, optionally, there is the QCL relationship between consecutive candidate SSBs of the first quantity within the one transmission period, where the first quantity is stipulated by the protocol or configured by the network device.

Optionally, the network device may configure the first quantity by using a PBCH message, a SIB message, or an RRC message.

Optionally, a value of the first quantity is the same as a value of a beam index of the first SSB, the value of the beam index (beam index) of the first SSB is a result of rounding a first value, and the first value is a ratio of a value of a candidate index corresponding to the first SSB to the first quantity.

Specifically, the value of the beam index of the first SSB is the result of rounding down the first value, where the first value=floor (candidate SSB index/Q), and Q represents the first quantity.

Optionally, in the specific embodiment 1, the information related to sending of the first SSB may include at least one of the following examples, so as to implement, with reference to the first SSB pattern, diversity of schemes of determining the candidate SSB index corresponding to the first SSB.

Example 1

In the example 1, the information related to sending of the first SSB includes first information, where the first information is used to indicate a first bitmap corresponding to a beam index of the first SSB.

Optionally, in the example 1, in a case that the first bitmap is a second value, the first information is used to indicate that the network device does not send SSBs corresponding to all candidate SSB indexes associated with the beam index of the first SSB; and in a case that the first bitmap is a third value, the first information is used to indicate that the network device sends a target SSB corresponding to at least one candidate SSB index associated with the beam index of the first SSB.

In an example, if the second value is 0, it may indicate that the SSBs corresponding to all the candidate SSB indexes associated with the beam index of the first SSB are not sent. If the third value is 1, it may indicate that the target SSB corresponding to the at least one candidate SSB index associated with the beam index of the first SSB is actually sent. It should be noted that when the second value is 1, the third value may be 0, that is, vice versa.

Further, optionally, in the example 1, if the first bitmap is the third value, the target SSB includes one of the following:

(1) all SSBs corresponding to the at least one candidate SSB index associated with the beam index of the first SSB; and (2) an SSB corresponding to a first candidate SSB index in the at least one candidate SSB index associated with the beam index of the first SSB.

In an example, when the SSB corresponding to the first candidate SSB index is a specified SSB that is actually sent, the first SSB or the last SSB may be actually sent.

Optionally, the target SSB is related to a synchronization raster (sync raster) in which the target SSB is located; or the target SSB is related to a characteristic of a searched primary synchronization signal (PSS) or secondary synchronization signal (SSS).

Optionally, the SSB corresponding to the first candidate SSB index is stipulated by the protocol or implicitly indicated by the network device by using a first preset field.

Optionally, the first preset field may include a cell identity (cell ID), a PSS sequence (sequence) or an SSS sequence, and the like.

Example 2

In the example 2, the information related to sending of the first SSB includes the first information and second information, where the first information is used to indicate a first bitmap corresponding to a beam index of the first SSB; and the second information is used to indicate sending information of a plurality of candidate SSB indexes corresponding to a same beam index.

Optionally, in the example 2, in a case that the first bitmap is a second value, the first information is used to indicate that the network device does not send SSBs corresponding to all candidate SSB indexes associated with the beam index of the first SSB; and in a case that the first bitmap is a third value, the first information is used to indicate that the network device sends a target SSB corresponding to at least one candidate SSB index associated with the beam index of the first SSB.

In an example, if the second value is 0, it may indicate that the SSBs corresponding to all the candidate SSB indexes associated with the beam index of the first SSB are not sent. If the third value is 1, it may indicate that the target SSB corresponding to the at least one candidate SSB index associated with the beam index of the first SSB is actually sent. It should be noted that when the second value is 1, the third value may be 0, that is, vice versa.

Optionally, in the example 2, the second information may be indicated by using a 1-bit field, may be directly stipulated by the protocol (that is, predefined), or may be indicated by using another implicit relationship. For example, only one of an SSB0 {4, 5, 6, 7} and an SSB1 {8, 9, 10, 11} that have the QCL relationship shown in FIG. 2 is sent, or both an SSB0 and an SSB1 that have the QCL relationship are sent as a whole, which may be indicated by 1 bit or stipulated by the protocol, so as to improve a relatively sufficient gap (Gap). That is, the second information may be indicated in at least one of the following manners:

(1) Being indicated by a 1-bit field.

Further, optionally, the 1-bit field is configured by the network device in one of the following manners:

(a) the quantity of bits in a PBCH; and (b) the preset quantity of bits added to a first parameter. Optionally, the first parameter may be ssb-PositionsInBurst.

Further, optionally, in a case that a value indicated by the 1-bit field is a fourth value, the second information is used to indicate that the network device sends an SSB corresponding to a second candidate SSB index in a plurality of candidate SSB indexes corresponding to a beam index of the third value indicated by the first information; and in a case that the value indicated by the 1-bit field is a fifth value, the second information is used to indicate that the network device sends all SSBs corresponding to the plurality of candidate SSB indexes corresponding to the beam index of the third value indicated by the first information.

Optionally, when the fourth value is 0, the fifth value may be 1; or when the fourth value is 1, the fifth value may be 0.

Optionally, the SSB corresponding to the second candidate SSB index is stipulated by the protocol or implicitly indicated by the network device by using a third preset field.

In an example, when the SSB corresponding to the second candidate SSB index is a specified SSB that is actually sent, the first SSB or the last SSB may be actually sent.

(2) Being stipulated by the protocol.

(3) Being implicitly indicated by the network device by using a second preset field. Optionally, the second preset field may include a cell identity (cell ID), a PSS sequence (sequence) or an SSS sequence, and the like.

It can be learned from the foregoing that in the SSB transmission method in this embodiment of this application, the first information may be used to indicate whether to send the candidate SSB having the QCL relationship, and the first information may be further used to indicate a specific part of the candidate SSB having the QCL relationship that is to be sent. Alternatively, the first information may be used to indicate whether to send the candidate SSB having the QCL relationship, and the second information is used to indicate a specific part of the candidate SSB having the QCL relationship that is to be sent. The candidate SSB index may be indicated by using the first field and/or the second field.

Specific Embodiment 2

In the specific embodiment 2, the QCL relationship corresponds to a second synchronization information block pattern SSB pattern (Case E shown in FIG. 4. For corresponding descriptions, refer to corresponding content in the terminal-side embodiment. Details are not described herein again). Further, optionally, there is the QCL relationship between consecutive synchronization pulse sequence sets SS burst sets of the second quantity within the one transmission period and each of the SS burst sets includes consecutive candidate SSBs of the third quantity that are sequentially captured in all candidate SSBs.

Optionally, the second quantity is a result of performing a modulo operation on a sixth value, the sixth value is a ratio of a value of a candidate SSB index corresponding to the first SSB to the third quantity, and the third quantity is stipulated by the protocol or configured by the network device.

In an example, the second quantity=mod (candidate SSB index/M), where the candidate SSB index/M represents the sixth value, and M represents the third quantity.

Optionally, in the specific embodiment 2, the information related to sending of the first SSB may include at least one of the following examples, so as to implement, with reference to the second SSB pattern, diversity of schemes of determining the candidate SSB index corresponding to the first SSB.

Example I

In the example I, the information related to sending of the first SSB includes third information, where the third information is used to indicate a second bitmap corresponding to the first SSB.

In an example, if the second bitmap corresponding to the first SSB indicates 1, it may indicate that an SSB is actually sent; or if the second bitmap corresponding to the first SSB indicates 0, it may indicate that no SSB is sent. It should be noted that, when the second bitmap corresponding to the first SSB indicates 0, it may indicate that an SSB is actually sent, that is, vice versa.

Optionally, in the example I, the first SSB includes an SSB that are in a plurality of candidate SSBs corresponding to the third information and that is sent by the network device according to a preset rule.

Optionally, the preset rule includes one of the following:

(1) Perform, in each of the SS burst sets of the second quantity, hopping (hopping) sending on candidate SSBs corresponding to consecutive beam indexes indicated by the third information.

In an example, hopping sending is performed on consecutive SSB beams, for example, if the third information indicates (1101111 . . . 01011), each pair of consecutive "11" is sent on two SSB bursts, that is, (1001010 . . . 01010) is sent on a first SSB burst and (0100101 . . . 00001) is sent on a second SSB burst.

(2) Perform, between a plurality of SSB groups in each of the SS burst sets of the second quantity, hopping sending on candidate SSBs corresponding to consecutive beam indexes indicated by the third information, where the plurality of SSB groups are obtained by grouping SSBs in each SS burst set, and the quantity of SSBs included in each SSB group is stipulated by the protocol or configured by the network device.

Optionally, the quantity of SSBs included in each SSB group may be 4, 8, or the like, and may be specifically a multiple of 4.

In an example, SSBs are grouped. For the foregoing example of Case E, if four beams are consecutive, hopping sending may be performed in a unit of four beams, and there is a gap between every four beams. For example, if the third information indicates (1101111 . . . 01011), (1001101 . . . 01010) may be sent on a first SSB burst and (0100010 . . . 00001) is sent on a second SSB burst.

(3) Send a candidate SSB corresponding to a candidate SSB index of a first-type digit in an SS burst set whose index value is an odd number, and sending a candidate SSB corresponding to a candidate SSB index of a second-type digit in an SS burst set whose index value is an even number.

Optionally, when the first-type digit is an odd digit, the second-type digit is an even digit. On the contrary, when the first-type digit is an even digit, the second-type digit is an odd digit.

Optionally, the preset rule is related to a synchronization raster in which the first SSB is located; or the preset rule is related to a characteristic of a searched primary synchronization signal (PSS) or secondary synchronization signal (SSS).

Example II

In the example II, the information related to sending of the first SSB includes the third information and fourth information, where the third information is used to indicate a second bitmap corresponding to the first SSB.

In an example, if the second bitmap corresponding to the first SSB indicates 1, it may indicate that an SSB is actually sent; or if the second bitmap corresponding to the first SSB indicates 0, it may indicate that no SSB is sent.

It should be noted that, when the second bitmap corresponding to the first SSB indicates 0, it may indicate that an SSB is actually sent, that is, vice versa.

Optionally, in the example II, the fourth information is used to indicate a preset rule, and the preset rule is used by the network device to send the first SSB in a plurality of candidate SSBs corresponding to the third information.

Further, optionally, the fourth information may be indicated by using a 1-bit field, may be directly stipulated by the protocol (that is, predefined), or may be indicated by using another implicit relationship. That is, the fourth information may be indicated in at least one of the following manners:

(1) Being indicated by a 1-bit field.

(2) Being stipulated by the protocol.

(3) Being implicitly indicated by the network device by using a fourth preset field. Optionally, the fourth preset field may include a cell identity (cell ID), a PSS sequence (sequence) or an SSS sequence, and the like.

Optionally, the preset rule includes one of the following:

(1) Perform, in each of the SS burst sets of the second quantity, hopping sending on candidate SSBs corresponding to consecutive beam indexes indicated by the third information.

In an example, hopping sending is performed on consecutive SSB beams, for example, if the third information indicates (1101111 . . . 01011), each pair of consecutive "11" is sent on two SSB bursts, that is, (1001010 . . . 01010) is sent on a first SSB burst and (0100101 . . . 00001) is sent on a second SSB burst.

(2) Perform, between a plurality of SSB groups in each of the SS burst sets of the second quantity, hopping sending on candidate SSBs corresponding to consecutive beam indexes indicated by the third information, where the plurality of SSB groups are obtained by grouping SSBs in each SS burst set, and the quantity of SSBs included in each SSB group is stipulated by the protocol or configured by the network device.

Optionally, the quantity of SSBs included in each SSB group may be 4, 8, or the like, and may be specifically a multiple of 4.

In an example, SSBs are grouped. For the foregoing example of Case E, if four beams are consecutive, hopping sending may be performed in a unit of four beams, and there is a gap between every four beams. For example, if the third information indicates (1101111 . . . 01011), (1001101 . . . 01010) may be sent on a first SSB burst and (0100010 . . . 00001) is sent on a second SSB burst.

(3) Send a candidate SSB corresponding to a candidate SSB index of a first-type digit in an SS burst set whose index value is an odd number, and sending a candidate SSB corresponding to a candidate SSB index of a second-type digit in an SS burst set whose index value is an even number.

Optionally, when the first-type digit is an odd digit, the second-type digit is an even digit. On the contrary, when the first-type digit is an even digit, the second-type digit is an odd digit.

Optionally, the preset rule is related to a synchronization raster in which the first SSB is located; or the preset rule is related to a characteristic of a searched primary synchronization signal (PSS) or secondary synchronization signal (SSS).

It can be learned from the foregoing that in the SSB transmission method in this embodiment of this application, the third information may be used to indicate whether to send the candidate SSB having the QCL relationship, and the third information may be further used to indicate a specific part of the candidate SSB having the QCL relationship that is to be sent. Alternatively, the third information may be used to indicate whether to send the candidate SSB having the QCL relationship, and the fourth information is used to indicate a specific part of the candidate SSB having the QCL relationship that is to be sent. The candidate SSB index may be indicated by using the first field and/or the second field.

Figure 11:
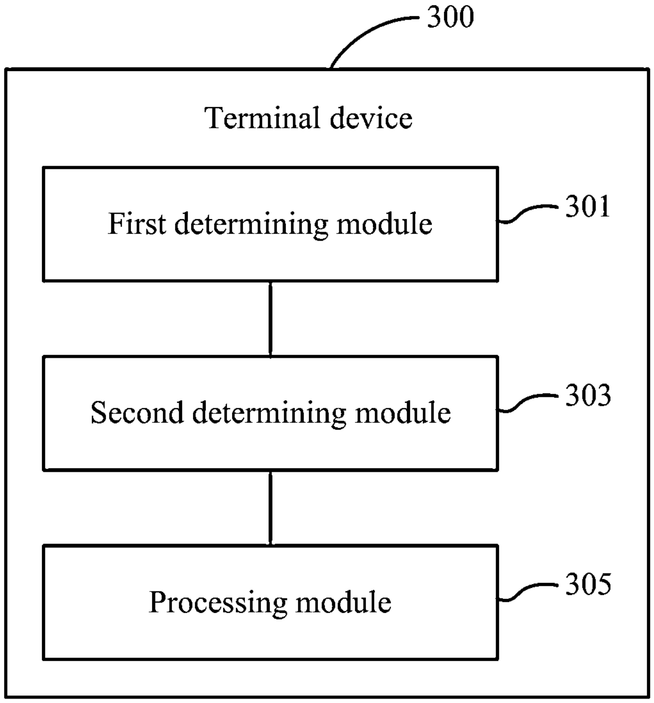
FIG. 11 is a schematic structural diagram of a terminal device according to an embodiment of this application.

Referring to FIG. 11, an embodiment of this application provides a terminal device 300. The terminal device 300 includes a first determining module 301, a second determining module 303, and a processing module 305.

The first determining module 301 is configured to determine a candidate SSB having a quasi-co-location (QCL) relationship within one transmission period, where the QCL relationship corresponds to a synchronization information block pattern SSB pattern; the second determining module 303 is configured to determine, according to the QCL relationship and information related to sending of a first SSB, a candidate SSB index corresponding to the first SSB, where the first SSB is a candidate SSB sent by a network device; and the processing module 305 is configured to perform a target operation according to the candidate SSB index corresponding to the first SSB.

Optionally, in the terminal device 300 in this embodiment of this application, the candidate SSB index corresponding to the first SSB is indicated by at least one of a first field and a second field corresponding to the first SSB.

Optionally, in the terminal device 300 in this embodiment of this application, the first field includes an indication field that is in a physical broadcast channel demodulation reference signal (PBCH-DMRS) and a physical broadcast channel (PBCH) corresponding to the first SSB and that is used to indicate an SSB index.

Optionally, in the terminal device 300 in this embodiment of this application, the second field includes at least one of the following:

a common subcarrier spacing indication field in the first SSB; a physical downlink shared channel demodulation reference signal (PDSCH-DMRS) position indication field in the first SSB; a physical downlink control channel configuration system information block indication field in the first SSB; and a reserved field in the first SSB.

Optionally, in the terminal device 300 in this embodiment of this application, there is an association relationship between the common subcarrier spacing indication field and a subcarrier spacing used by an SSB.

Optionally, in the terminal device 300 in this embodiment of this application, there is an association relationship between the PDSCH-DMRS position indication field and a subcarrier spacing used by an SSB; or the PDSCH-DMRS position indication field is used to indicate a fixed PDSCH-DMRS position and there is no association relationship between the PDSCH-DMRS position indication field and a subcarrier spacing used by an SSB.

Optionally, in the terminal device 300 in this embodiment of this application, the quantity of valid licenses in a configuration table corresponding to a CORESET indicated by the physical downlink control channel configuration system information block indicator field is less than a first threshold; and/or the quantity of valid licenses in a configuration table corresponding to a search space indicated by the physical downlink control channel configuration system information block indication field is less than a second threshold.

Optionally, in the terminal device 300 in this embodiment of this application, in a case that the QCL relationship corresponds to a first synchronization information block pattern SSB pattern, there is the QCL relationship between consecutive candidate SSBs of the first quantity within the one transmission period, where the first quantity is stipulated by the protocol or configured by the network device.

Optionally, in the terminal device 300 in this embodiment of this application, a value of the first quantity is the same as a value of a beam index of the first SSB, the value of the beam index of the first SSB is a result of rounding a first value, and the first value is a ratio of a value of a candidate index corresponding to the first SSB to the first quantity.

Optionally, in the terminal device 300 in this embodiment of this application, the information related to sending of the first SSB includes one of the following:

first information, where the first information is used to indicate a first bitmap corresponding to a beam index of the first SSB; and the first information and second information, where the second information is used to indicate sending information of a plurality of candidate SSB indexes corresponding to a same beam index.

Optionally, in the terminal device 300 in this embodiment of this application, in a case that the first bitmap is a second value, the first information is used to indicate that the network device does not send SSBs corresponding to all candidate SSB indexes associated with the beam index of the first SSB; and in a case that the first bitmap is a third value, the first information is used to indicate that the network device sends a target SSB corresponding to at least one candidate SSB index associated with the beam index of the first SSB.

Optionally, in the terminal device 300 in this embodiment of this application, in a case that the information related to sending of the first SSB includes only the first information and the first bitmap is the third value, the target SSB includes one of the following:

- all SSBs corresponding to the at least one candidate SSB index associated with the beam index of the first SSB; and an SSB corresponding to a first candidate SSB index in the at least one candidate SSB index associated with the beam index of the first SSB.

Optionally, in the terminal device 300 in this embodiment of this application, the target SSB is related to a synchronization raster in which the target SSB is located; or the target SSB is related to a characteristic of a searched primary synchronization signal (PSS) or secondary synchronization signal (SSS).

Optionally, in the terminal device 300 in this embodiment of this application, the SSB corresponding to the first candidate SSB index is stipulated by the protocol or implicitly indicated by the network device by using a first preset field.

Optionally, in the terminal device 300 in this embodiment of this application, the second information is indicated in at least one of the following manners: being indicated by a 1-bit field; being stipulated by the protocol; and being implicitly indicated by the network device by using a second preset field.

Optionally, in the terminal device 300 in this embodiment of this application, the 1-bit field is configured by the network device in one of the following manners: the quantity of bits in a PBCH; and the preset quantity of bits added to a first parameter.

Optionally, in the terminal device 300 in this embodiment of this application, in a case that a value indicated by the 1-bit field is a fourth value, the second information is used to indicate indicate that the network device sends an SSB corresponding to a second candidate SSB index in a plurality of candidate SSB indexes corresponding to a beam index of the third value indicated by the first information; and in a case that the value indicated by the 1-bit field is a fifth value, the second information is used to indicate indicate that the network device sends all SSBs corresponding to the plurality of candidate SSB indexes corresponding to the beam index of the third value indicated by the first information.

Optionally, in the terminal device 300 in this embodiment of this application, the SSB corresponding to the second candidate SSB index is stipulated by the protocol or implicitly indicated by the network device by using a third preset field.

Optionally, in the terminal device 300 in this embodiment of this application, in a case that the QCL relationship corresponds to a second synchronization information block pattern SSB pattern, there is the QCL relationship between consecutive synchronization pulse sequence sets SS burst sets of the second quantity within the one transmission period and each of the SS burst sets includes consecutive candidate SSBs of the third quantity that are sequentially captured in all candidate SSBs.

Optionally, in the terminal device 300 in this embodiment of this application, the second quantity is a result of performing a modulo operation on a sixth value, the sixth value is a ratio of a value of a candidate SSB index corresponding to the first SSB to the third quantity, and the third quantity is stipulated by the protocol or configured by the network device.

Optionally, in the terminal device 300 in this embodiment of this application, the information related to sending of the first SSB includes one of the following: third information, where the third information is used to indicate a second bitmap corresponding to the first SSB; and the third information and fourth information.

Optionally, in the terminal device 300 in this embodiment of this application, in a case that the information related to sending of the first SSB includes only the third information, the first SSB includes an SSB that are in a plurality of candidate SSBs corresponding to the third information and that is sent by the network device according to a preset rule.

Optionally, in the terminal device 300 in this embodiment of this application, the fourth information is used to indicate a preset rule, and the preset rule is used by the network device to send the first SSB in a plurality of candidate SSBs corresponding to the third information.

Optionally, in the terminal device 300 in this embodiment of this application, the fourth information indicates the preset rule in at least one of the following manners: being indicated by a 1-bit field; being stipulated by the protocol; and being implicitly indicated by the network device by using a fourth preset field.

Optionally, in the terminal device 300 in this embodiment of the present disclosure, the preset rule includes one of the following:

performing, in each of the SS burst sets of the second quantity, hopping sending on candidate SSBs corresponding to consecutive beam indexes indicated by the third information; performing, between a plurality of SSB groups in each of the SS burst sets of the second quantity, hopping sending on candidate SSBs corresponding to consecutive beam indexes indicated by the third information, where the plurality of SSB groups are obtained by grouping SSBs in each SS burst set, and the quantity of SSBs included in each SSB group is stipulated by the protocol or configured by the network device; and sending a candidate SSB corresponding to a candidate SSB index of a first-type digit in an SS burst set whose index value is an odd number, and sending a candidate SSB corresponding to a candidate SSB index of a second-type digit in an SS burst set whose index value is an even number.

Optionally, in the terminal device 300 in this embodiment of this application, the preset rule is related to a synchronization raster in which the first SSB is located; or the preset rule is related to a characteristic of a searched primary synchronization signal (PSS) or secondary synchronization signal (SSS).

It can be understood that the terminal device 300 provided in this embodiment of this application can implement the above synchronization signal block (SSB) transmission method performed by the terminal device 300, and relevant descriptions of the synchronization signal block (SSB) transmission method is applicable to the terminal device 300. Details are not described herein again.

In this embodiment of this application, a terminal device may first determine an extended candidate SSB having a quasi-co-location (QCL) relationship within one transmission period, and may determine, according to the QCL relationship corresponding to a specific synchronization information block pattern SSB pattern and information related to sending of a first SSB, that is, a candidate SSB actually sent by a network device, a candidate SSB index corresponding to the first SSB actually sent by the network device, so as to further perform some subsequent operations, that is, a target operation, according to the candidate SSB index corresponding to the actually sent SSB. In this way, the quantity of existing candidate SSBs is extended, and limited SSB transmission is performed based on SSB information actually sent by the network device in different SSB patterns, to resolve a problem that a switching time of an SSB receive beam is insufficient, thereby improving system communication efficiency. Especially, in a high frequency band (for example, a frequency band FR2x, that is, a frequency band beyond 52.6 GHz), because a relatively large subcarrier spacing is used by an SSB, there is no gap between many candidate SSBs, and a length of a CP is insufficient to support a switching time of an SSB receive beam.

Figure 12:
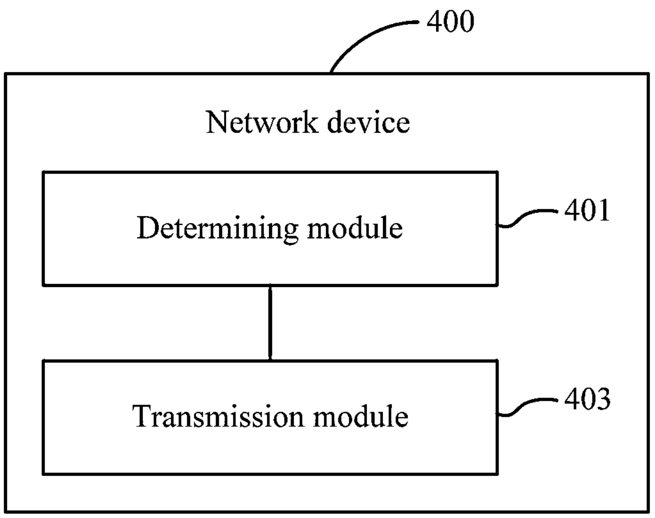
FIG. 12 is a schematic structural diagram of a network device according to an embodiment of this application.

Referring to FIG. 12, an embodiment of this application provides a network device 400. The network device 400 includes a determining module 401 and a transmission module 403.

The determining module 401 is configured to determine a candidate SSB having a quasi-co-location (QCL) relationship within one transmission period, where the QCL relationship corresponds to a synchronization information block pattern SSB pattern; and the transmission module 403 is configured to send a first SSB to a terminal device, where a candidate SSB index corresponding to the first SSB is determined based on the QCL relationship and information related to sending of the first SSB.

Optionally, in the network device 400 in this embodiment of this application, the candidate SSB index corresponding to the first SSB is indicated by at least one of a first field and a second field corresponding to the first SSB.

Optionally, in the network device 400 in this embodiment of this application, the first field includes an indication field that is in a physical broadcast channel demodulation reference signal (PBCH-DMRS) and a physical broadcast channel (PBCH) corresponding to the first SSB and that is used to indicate an SSB index.

Optionally, in the network device 400 in this embodiment of this application, the second field includes at least one of the following:

a common subcarrier spacing indication field in the first SSB; a physical downlink shared channel demodulation reference signal (PDSCH-DMRS) position indication field in the first SSB; a physical downlink control channel configuration system information block indication field in the first SSB; and a reserved field in the first SSB.

Optionally, in the network device 400 in this embodiment of this application, there is an association relationship between the common subcarrier spacing indication field and a subcarrier spacing used by an SSB.

Optionally, in the network device 400 in this embodiment of this application, there is an association relationship between the PDSCH-DMRS position indication field and a subcarrier spacing used by an SSB; or the PDSCH-DMRS position indication field is used to indicate a fixed PDSCH-DMRS position and there is no association relationship between the PDSCH-DMRS position indication field and a subcarrier spacing used by an SSB.

Optionally, in the network device 400 in this embodiment of this application, the quantity of valid licenses in a configuration table corresponding to a CORESET indicated by the physical downlink control channel configuration system information block indicator field is less than a first threshold; and/or the quantity of valid licenses in a configuration table corresponding to a search space indicated by the physical downlink control channel configuration system information block indication field is less than a second threshold.

Optionally, in the network device 400 in this embodiment of this application, in a case that the QCL relationship corresponds to a first synchronization information block pattern SSB pattern, there is the QCL relationship between consecutive candidate SSBs of the first quantity within the one transmission period, where the first quantity is stipulated by the protocol or configured by the network device.

Optionally, in the network device 400 in this embodiment of this application, a value of the first quantity is the same as a value of a beam index of the first SSB, the value of the beam index of the first SSB is a result of rounding a first value, and the first value is a ratio of a value of a candidate index corresponding to the first SSB to the first quantity.

Optionally, in the network device 400 in this embodiment of this application, the information related to sending of the first SSB includes one of the following:

first information, where the first information is used to indicate a first bitmap corresponding to a beam index of the first SSB; and the first information and second information, where the second information is used to indicate sending information of a plurality of candidate SSB indexes corresponding to a same beam index.

Optionally, in the network device 400 in this embodiment of this application, in a case that the first bitmap is a second value, the first information is used to indicate that the network device does not send SSBs corresponding to all candidate SSB indexes associated with the beam index of the first SSB; and in a case that the first bitmap is a third value, the first information is used to indicate that the network device sends a target SSB corresponding to at least one candidate SSB index associated with the beam index of the first SSB.

Optionally, in the network device 400 in this embodiment of this application, in a case that the information related to sending of the first SSB includes only the first information and the first bitmap is the third value, the target SSB includes one of the following:

all SSBs corresponding to the at least one candidate SSB index associated with the beam index of the first SSB; and an SSB corresponding to a first candidate SSB index in the at least one candidate SSB index associated with the beam index of the first SSB.

Optionally, in the network device 400 in this embodiment of this application, the target SSB is related to a synchronization raster in which the target SSB is located; or the target SSB is related to a characteristic of a searched primary synchronization signal (PSS) or secondary synchronization signal (SSS).

Optionally, in the network device 400 in this embodiment of this application, the SSB corresponding to the first candidate SSB index is stipulated by the protocol or implicitly indicated by the network device by using a first preset field.

Optionally, in the network device 400 in this embodiment of this application, the second information is indicated in at least one of the following manners: being indicated by a 1-bit field; being stipulated by the protocol; and being implicitly indicated by the network device by using a second preset field.

Optionally, in the network device 400 in this embodiment of this application, the 1-bit field is configured by the network device in one of the following manners: the quantity of bits in a PBCH; and the preset quantity of bits added to a first parameter.

Optionally, in the network device 400 in this embodiment of this application, in a case that a value indicated by the 1-bit field is a fourth value, the second information is used to indicate that the network device sends an SSB corresponding to a second candidate SSB index in a plurality of candidate SSB indexes corresponding to a beam index of the third value indicated by the first information; and in a case that the value indicated by the 1-bit field is a fifth value, the second information is used to indicate that the network device sends all SSBs corresponding to the plurality of candidate SSB indexes corresponding to the beam index of the third value indicated by the first information.

Optionally, in the network device 400 in this embodiment of this application, the SSB corresponding to the second candidate SSB index is stipulated by the protocol or implicitly indicated by the network device by using a third preset field.

Optionally, in the network device 400 in this embodiment of this application, in a case that the QCL relationship corresponds to a second synchronization information block pattern SSB pattern, there is the QCL relationship between consecutive synchronization pulse sequence sets SS burst sets of the second quantity within the one transmission period and each of the SS burst sets includes consecutive candidate SSBs of the third quantity that are sequentially captured in all candidate SSBs.

Optionally, in the network device 400 in this embodiment of this application, the second quantity is a result of performing a modulo operation on a sixth value, the sixth value is a ratio of a value of a candidate SSB index corresponding to the first SSB to the third quantity, and the third quantity is stipulated by the protocol or configured by the network device.

Optionally, in the network device 400 in this embodiment of this application, the information related to sending of the first SSB includes one of the following: third information, where the third information is used to indicate a second bitmap corresponding to the first SSB; and the third information and fourth information.

Optionally, in the network device 400 in this embodiment of this application, in a case that the information related to sending of the first SSB includes only the third information, the first SSB includes an SSB that are in a plurality of candidate SSBs corresponding to the third information and that is sent by the network device according to a preset rule.

Optionally, in the network device 400 in this embodiment of this application, the fourth information is used to indicate a preset rule, and the preset rule is used by the network device to send the first SSB in a plurality of candidate SSBs corresponding to the third information.

Optionally, in the network device 400 in this embodiment of this application, the fourth information indicates the preset rule in at least one of the following manners: being indicated by a 1-bit field; being stipulated by the protocol; and being implicitly indicated by the network device by using a fourth preset field.

Optionally, in the network device 400 in this embodiment of the present disclosure, the preset rule includes one of the following:

performing, in each of the SS burst sets of the second quantity, hopping sending on candidate SSBs corresponding to consecutive beam indexes indicated by the third information; performing, between a plurality of SSB groups in each of the SS burst sets of the second quantity, hopping sending on candidate SSBs corresponding to consecutive beam indexes indicated by the third information, where the plurality of SSB groups are obtained by grouping SSBs in each SS burst set, and the quantity of SSBs included in each SSB group is stipulated by the protocol or configured by the network device; and sending a candidate SSB corresponding to a candidate SSB index of a first-type digit in an SS burst set whose index value is an odd number, and sending a candidate SSB corresponding to a candidate SSB index of a second-type digit in an SS burst set whose index value is an even number.

Optionally, in the network device 400 in this embodiment of this application, the preset rule is related to a synchronization raster in which the first SSB is located; or the preset rule is related to a characteristic of a searched primary synchronization signal (PSS) or secondary synchronization signal (SSS).

It can be understood that the network device 400 provided in this embodiment of this application can implement the above synchronization signal block (SSB) transmission method performed by the network device 400, and relevant descriptions of the synchronization signal block (SSB) transmission method is applicable to the network device 400. Details are not described herein again.

In this embodiment of this application, a network device may first determine an extended candidate SSB having a quasi-co-location (QCL) relationship within one transmission period, and may determine, according to the QCL relationship corresponding to a specific synchronization information block pattern SSB pattern and information related to sending of a first SSB, that is, a candidate SSB that actually needs to be sent, a candidate SSB index corresponding to the actually sent first SSB, and further send the first SSB to a terminal device, so that the terminal device can perform some subsequent operations based on the candidate SSB index corresponding to the first SSB. In this way, the quantity of existing candidate SSBs is extended, and limited SSB transmission is performed based on SSB information that actually needs to be sent in different SSB patterns, to resolve a problem that a switching time of an SSB receive beam is insufficient, thereby improving system communication efficiency. Especially, in a high frequency band (for example, a frequency band FR2x, that is, a frequency band beyond 52.6 GHz), because a relatively large subcarrier spacing is used by an SSB, there is no gap between many candidate SSBs, and a length of a CP is insufficient to support a switching time of an SSB receive beam.

Figure 13:
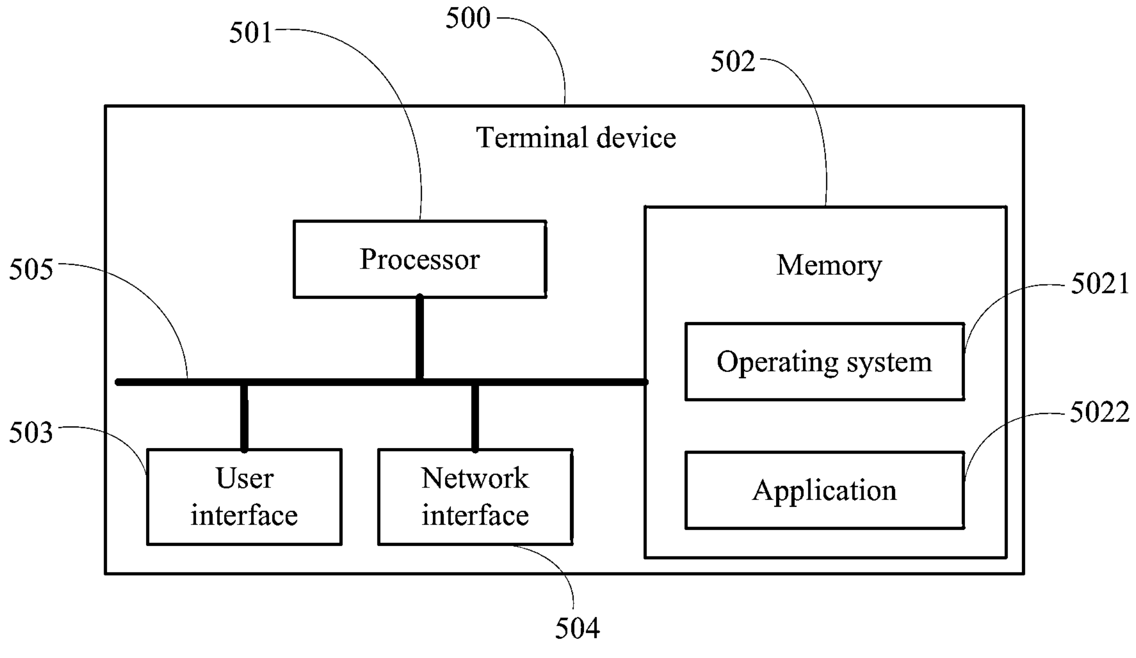
FIG. 13 is a second schematic structural diagram of a terminal device according to an embodiment of this application.

FIG. 13 is a block diagram of a terminal device according to another embodiment of this application. A terminal device 500 shown in FIG. 13 includes at least one processor 501, a memory 502, at least one network interface 504, and a user interface 503. All components of the terminal device 500 are coupled together by using the bus system 505. It can be understood that the bus system 505 is configured to implement a connection and communication between these components. In addition to a data bus, the bus system 505 may include a power bus, a control bus, and a status signal bus. However, for clarity of description, various buses are marked as the bus system 505 in FIG. 13.

The user interface 503 may include a display, a keyboard, or a clicking device (for example, a mouse, a trackball (trackball)), a touch panel, or a touchscreen.

It can be understood that the memory 502 in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchlink dynamic random access memory (SLDRAM), and a direct rambus random access memory (DRRAM). The memory 502 in the system and the method that are described in the embodiments of this application is to include but is not limited to these memories and a memory of any other proper type.

In some implementation manners, the memory 502 stores the following element, an executable module or a data structure, or a subset thereof, or an extension set thereof: an operating system 5021 and an application 5022.

The operating system 5021 includes various system programs, for example, a framework layer, a kernel library layer, and a driver layer. The operating system is configured to implement various basic services and process hardware-based tasks. The application 5022 includes various applications, for example, a media player (Media Player), and a browser (Browser), to implement various application services. A program for implementing the method in the embodiments of this application may be included in the application 5022.

In this embodiment of this application, the terminal device 500 further includes a program or an instruction that is stored in the memory 502 and that can be run on the processor 501, and when the program or the instruction is executed by the processor 501, the following steps are implemented:

determining a candidate SSB having a quasi-co-location (QCL) relationship within one transmission period, where the QCL relationship corresponds to a synchronization information block pattern SSB pattern; determining, according to the QCL relationship and information related to sending of a first SSB, a candidate SSB index corresponding to the first SSB, where the first SSB is a candidate SSB sent by a network device; and performing a target operation according to the candidate SSB index corresponding to the first SSB.

In this embodiment of this application, a terminal device may first determine an extended candidate SSB having a quasi-co-location (QCL) relationship within one transmission period, and may determine, according to the QCL relationship corresponding to a specific synchronization information block pattern SSB pattern and information related to sending of a first SSB, that is, a candidate SSB actually sent by a network device, a candidate SSB index corresponding to the first SSB actually sent by the network device, so as to further perform some subsequent operations, that is, a target operation, according to the candidate SSB index corresponding to the actually sent SSB. In this way, the quantity of existing candidate SSBs is extended, and limited SSB transmission is performed based on SSB information actually sent by the network device in different SSB patterns, to resolve a problem that a switching time of an SSB receive beam is insufficient, thereby improving system communication efficiency. Especially, in a high frequency band (for example, a frequency band FR2x, that is, a frequency band beyond 52.6 GHz), because a relatively large subcarrier spacing is used by an SSB, there is no gap between many candidate SSBs, and a length of a CP is insufficient to support a switching time of an SSB receive beam.

The methods disclosed in the foregoing embodiments of this application may be applied to the processor 501, or may be implemented by the processor 501. The processor 501 may be an integrated circuit chip and has a signal processing capability. During implementation, each step of the foregoing method may be completed by using an integrated logic circuit of hardware in the processor 501 or an instruction in a form of software. The foregoing processor 501 may be a general-purpose processor, a digital signal processor (DSP), an application-specific integrated circuit (ASIC), a field programmable gate array (FPGA) or another programmable logic component, a discrete gate or a transistor logic component, or a discrete hardware component. The processor may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished through a hardware decoding processor, or may be executed and accomplished by using a combination of hardware and software modules in the decoding processor. A software module may be located in a mature computer-readable storage medium in the art, such as a random access memory, a flash memory, a read-only memory, a programmable read-only memory, an electrically erasable programmable memory, a register, or the like. The computer-readable storage medium is located in the memory 502, and the processor 501 reads information in the memory 502 and completes the steps in the foregoing method in combination with hardware of the processor 501. Specifically, the computer-readable storage medium stores a computer program, and when the computer program is executed by the processor 501, the steps of the above synchronization signal block (SSB) transmission method embodiment are implemented.

It can be understood that the embodiments described in the embodiments of this application may be implemented by hardware, software, firmware, middleware, microcode, or a combination thereof. For hardware implementation, a processing unit may be implemented in one or more Application Specific Integrated Circuits (ASIC), digital signal processors (DSP), digital signal processing devices (DSPD), programmable logic devices (PLD), field programmable gate arrays (FPGA), general purpose processors, controllers, microcontrollers, microprocessors, or other electronic units or a combination thereof used to perform the functions in this application.

For software implementation, the technology in the embodiments of this application may be implemented through modules (for example, procedures or functions) that perform the functions in the embodiments of this application. Software code may be stored in a memory and executed by a processor. The memory may be implemented in the processor or outside the processor.

The terminal device 500 can implement each process implemented by the terminal device in the foregoing embodiment. To avoid repetition, details are not described herein again.

Preferably, an embodiment of this application further provides a terminal device, including a processor, a memory, and a program or an instruction that is stored in the memory and that can be run on the processor. When the program or the instruction is executed by the processor, the processes of the above synchronization signal block (SSB) transmission method embodiment are implemented and a same technical effect can be achieved. To avoid repetition, details are not described herein again.

An embodiment of this application further provides a readable storage medium. The readable storage medium stores a program or an instruction, and when the program or the instruction is executed by a processor, the processes of the above synchronization signal block (SSB) transmission method embodiment applied to the terminal device are implemented and a same technical effect can be achieved. To avoid repetition, details are not described herein again.

The processor is a processor in the terminal device in the foregoing embodiment. The readable storage medium includes a computer-readable storage medium, such as a computer read-only memory (ROM), a random access memory (RAM), a magnetic disk, or an optical disc.

Figure 14:
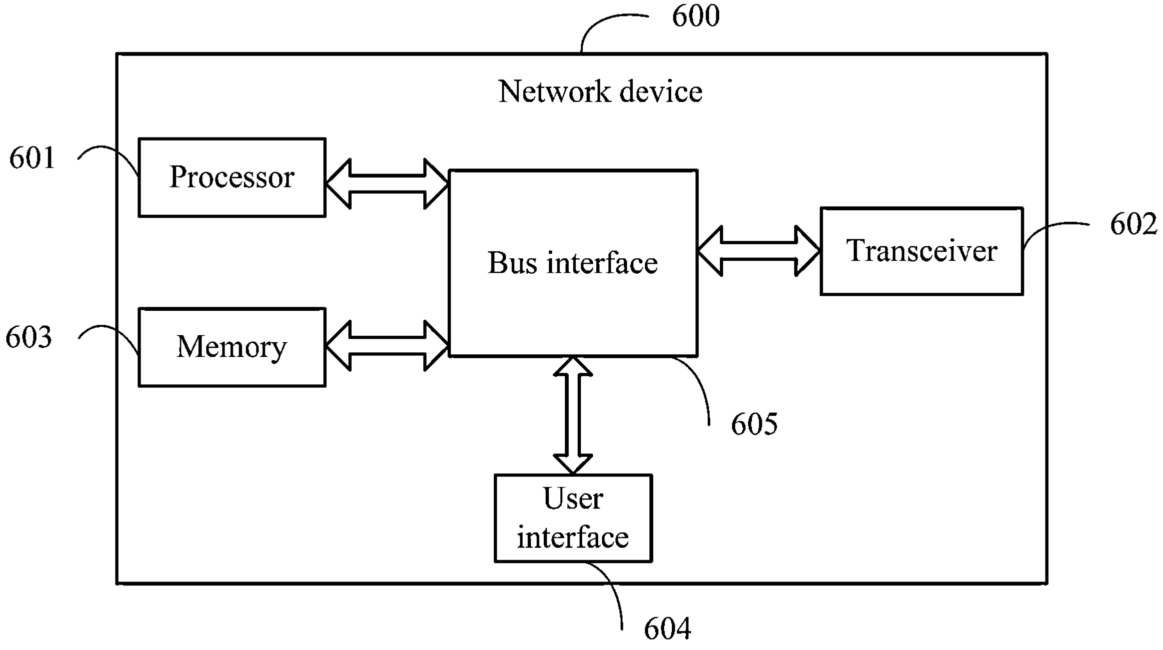
FIG. 14 is a second schematic structural diagram of a network device according to an embodiment of this application

Referring to FIG. 14, FIG. 14 is a structural diagram of a network device to which an embodiment of this application is applied, and the network device can implement details of the above synchronization signal block (SSB) transmission method and achieve a same effect. As shown in FIG. 14, a network device 600 includes a processor 601, a transceiver 602, a memory 603, a user interface 604, and a bus interface 605.

In this embodiment of this application, the network device 600 further includes a program or an instruction that is stored in the memory 603 and that can be run on the processor 601, and when the program or the instruction is executed by the processor 601, the following steps are implemented:

determining a candidate SSB having a quasi-co-location (QCL) relationship within one transmission period, where the QCL relationship corresponds to a synchronization information block pattern SSB pattern; and sending a first SSB to a terminal device, where a candidate SSB index corresponding to the first SSB is determined based on the QCL relationship and information related to sending of the first SSB.

In this embodiment of this application, a network device may first determine an extended candidate SSB having a quasi-co-location (QCL) relationship within one transmission period, and may determine, according to the QCL relationship corresponding to a specific synchronization information block pattern SSB pattern and information related to sending of a first SSB, that is, a candidate SSB that actually needs to be sent, a candidate SSB index corresponding to the actually sent first SSB, and further send the first SSB to a terminal device, so that the terminal device can perform some subsequent operations based on the candidate SSB index corresponding to the first SSB. In this way, the quantity of existing candidate SSBs is extended, and limited SSB transmission is performed based on SSB information that actually needs to be sent in different SSB patterns, to resolve a problem that a switching time of an SSB receive beam is insufficient, thereby improving system communication efficiency. Especially, in a high frequency band (for example, a frequency band FR2x, that is, a frequency band beyond 52.6 GHz), because a relatively large subcarrier spacing is used by an SSB, there is no gap between many candidate SSBs, and a length of a CP is insufficient to support a switching time of an SSB receive beam.

In FIG. 14, a bus architecture may include any quantity of interconnected buses and bridges. Specifically, various circuits of one or more processors represented by the processor 601 and a memory represented by the memory 603 are interconnected. The bus architecture may further link various other circuits such as a peripheral device, a voltage regulator, and a power management circuit. These are well known in the art, and therefore are not further described in this specification. A bus interface 605 provides an interface. The transceiver 602 may be a plurality of components. To be specific, the transceiver 602 includes a transmitter and a receiver, and provides a unit configured to communicate with various other apparatuses on a transmission medium. For different user equipment, a user interface 604 may be an interface that can externally or internally connect to a needed device, and the connected device includes but is not limited to a keypad, a display, a loudspeaker, a microphone, and a joystick.

The processor 601 is responsible for bus architecture management and general processing. The memory 603 may store data used by the processor 601 when the processor 601 performs an operation.

Preferably, an embodiment of this application further provides a network device, including a processor, a memory, and a program or an instruction that is stored in the memory and that can be run on the processor. When the program or the instruction is executed by the processor, the processes of the above synchronization signal block (SSB) transmission method embodiment are implemented and a same technical effect can be achieved. To avoid repetition, details are not described herein again.

An embodiment of this application further provides a readable storage medium. The readable storage medium stores a program or an instruction, and when the program or the instruction is executed by a processor, the processes of the above synchronization signal block (SSB) transmission method embodiment applied to the network device are implemented and a same technical effect can be achieved. To avoid repetition, details are not described herein again.

The processor is a processor in the network device in the foregoing embodiment. The readable storage medium includes a computer-readable storage medium, such as a computer read-only memory (ROM), a random access memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A synchronization signal block (SSB) transmission method, performed by a terminal device, wherein the method comprises:

determining a candidate SSB having a quasi-co-location (QCL) relationship within one transmission period, wherein the QCL relationship corresponds to a synchronization information block pattern SSB pattern;

determining, according to the QCL relationship and information related to sending of a first SSB, a candidate SSB index corresponding to the first SSB, wherein the first SSB is a candidate SSB sent by a network device; and performing a target operation according to the candidate SSB index corresponding to the first SSB, wherein the target operation comprises at least one of: a rate matching, a physical random access channel (PRACH) validation, a physical uplink control (PUCCH) validation.

2. The method according to claim 1, wherein the candidate SSB index corresponding to the first SSB is indicated by at least one of a first field and a second field corresponding to the first SSB.

3. The method according to claim 2, wherein the first field comprises an indication field that is in a physical broadcast channel demodulation reference signal (PBCH-DMRS) and a physical broadcast channel (PBCH) corresponding to the first SSB and that is used to indicate an SSB index.

4. The method according to claim 2, wherein the second field comprises at least one of the following: a common subcarrier spacing indication field in the first SSB; a physical downlink shared channel demodulation reference signal (PDSCH-DMRS) position indication field in the first SSB; a physical downlink control channel configuration system information block indication field in the first SSB; and a reserved field in the first SSB.

5. The method according to claim 4, wherein there is an association relationship between the common subcarrier spacing indication field and a subcarrier spacing used by an SSB.

6. The method according to claim 4, wherein there is an association relationship between the PDSCH-DMRS position indication field and a subcarrier spacing used by an SSB; or the PDSCH-DMRS position indication field is used to indicate a fixed PDSCH-DMRS position and there is no association relationship between the PDSCH-DMRS position indication field and a subcarrier spacing used by an SSB.

7. The method according to claim 4, wherein the quantity of valid licenses in a configuration table corresponding to a CORESET indicated by the physical downlink control channel configuration system information block indicator field is less than a first threshold; or the quantity of valid licenses in a configuration table corresponding to a search space indicated by the physical downlink control channel configuration system information block indication field is less than a second threshold.

8. The method according to claim 1, wherein in a case that the QCL relationship corresponds to a first synchronization information block pattern SSB pattern, there is the QCL relationship between consecutive candidate SSBs of the first quantity within the one transmission period, wherein the first quantity is stipulated by the protocol or configured by the network device.

9. The method according to claim 8, wherein a value of the first quantity is the same as a value of a beam index of the first SSB, the value of the beam index of the first SSB is a result of rounding a first value, and the first value is a ratio of a value of a candidate index corresponding to the first SSB to the first quantity.

10. The method according to claim 8, wherein the information related to sending of the first SSB comprises one of the following: first information, wherein the first information is used to indicate a first bitmap corresponding to a beam index of the first SSB; and the first information and second information, wherein the second information is used to indicate sending information of a plurality of candidate SSB indexes corresponding to a same beam index.

11. The method according to claim 10, wherein in a case that the first bitmap is a second value, the first information is used to indicate that the network does not send SSBs corresponding to all candidate SSB indexes associated with the beam index of the first SSB; and in a case that the first bitmap is a third value, the first information is used to indicate that the network does not send a target SSB corresponding to at least one candidate SSB index associated with the beam index of the first SSB.

12. The method according to claim 11, wherein in a case that the information related to sending of the first SSB comprises only the first information and the first bitmap is the third value, the target SSB comprises one of the following: all SSBs corresponding to the at least one candidate SSB index associated with the beam index of the first SSB; and an SSB corresponding to a first candidate SSB index in the at least one candidate SSB index associated with the beam index of the first SSB.

13. The method according to claim 12, wherein the target SSB is related to a synchronization raster in which the target SSB is located; or the target SSB is related to a characteristic of a searched primary synchronization signal (PSS) or secondary synchronization signal (SSS).

14. The method according to claim 12, wherein the SSB corresponding to the first candidate SSB index is stipulated by the protocol or implicitly indicated by the network device by using a first preset field.

15. The method according to claim 10, wherein the second information is indicated in at least one of the following manners: being indicated by a 1-bit field; being stipulated by the protocol; and being implicitly indicated by the network device by using a second preset field.

16. The method according to claim 15, wherein the 1-bit field is configured by the network device in one of the following manners: the quantity of bits in a PBCH; and the preset quantity of bits added to a first parameter.

17. The method according to claim 15, wherein in a case that a value indicated by the 1-bit field is a fourth value, the second information is used to indicate that the network device sends an SSB corresponding to a second candidate SSB index in a plurality of candidate SSB indexes corresponding to a beam index of the third value indicated by the first information; and in a case that the value indicated by the 1-bit field is a fifth value, the second information is used to indicate that the network device sends all SSBs corresponding to the plurality of candidate SSB indexes corresponding to the beam index of the third value indicated by the first information.

18. The method according to claim 1, wherein in a case that the QCL relationship corresponds to a second synchronization information block pattern SSB pattern, there is the QCL relationship between consecutive synchronization pulse sequence sets SS burst sets of the second quantity within the one transmission period and each of the SS burst sets comprises consecutive candidate SSBs of the third quantity that are sequentially captured in all candidate SSBs.

19. A terminal device, comprising:

a memory, at least one hardware processor, and a program or an instruction that is stored in the memory executable by the at least one hardware processor that, when executed, directs the at least one hardware processor to:

determine a candidate SSB having a quasi-co-location QCL relationship within one transmission period, wherein the QCL relationship corresponds to a synchronization information block pattern SSB pattern;

determine, according to the QCL relationship and information related to sending of a first SSB, a candidate SSB index corresponding to the first SSB, wherein the first SSB is a candidate SSB sent by a network device; and perform a target operation according to the candidate SSB index corresponding to the first SSB, wherein the target operation comprises at least one of: a rate matching, a physical random access channel (PRACH) validation, a physical uplink control (PUCCH) validation.

20. A network device, comprising:

a memory, at least one hardware processor, and a program or an instruction that is stored in the memory and executable by the at least one hardware processor that, when executed, directs the at least one hardware processor to:

determine a candidate SSB having a quasi-co-location (QCL) relationship within one transmission period, wherein the QCL relationship corresponds to a synchronization information block pattern SSB pattern; and send a first SSB to a terminal device, wherein a candidate SSB index corresponding to the first SSB is determined based on the QCL relationship and information related to sending of the first SSB to enable the terminal device to perform a target operation according to the candidate SSB index corresponding to the first SSB, wherein the target operation comprises at least one of: a rate matching, a physical random access channel (PRACH) validation, a physical uplink control (PUCCH) validation.

* * * * *